(12) United States Patent
Mine et al.

(10) Patent No.: US 8,612,715 B2
(45) Date of Patent: *Dec. 17, 2013

(54) STORAGE SYSTEM AND UTILIZATION MANAGEMENT METHOD FOR STORAGE SYSTEM

(75) Inventors: Hiroshi Mine, Yokohama (JP); Hitoshi Kamei, Sagamihara (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/529,626

(22) Filed: Jun. 21, 2012

(65) Prior Publication Data

US 2012/0265961 A1    Oct. 18, 2012

Related U.S. Application Data

(63) Continuation of application No. 12/526,779, filed as application No. PCT/JP2009/002074 on May 13, 2009, now Pat. No. 8,225,066.

(51) Int. Cl.
*G06F 12/02* (2006.01)

(52) U.S. Cl.
USPC ................................. 711/171; 711/E12.002

(58) Field of Classification Search
None
See application file for complete search history.

(56) References Cited

U.S. PATENT DOCUMENTS

| | | |
|---|---|---|
| 2006/0069665 A1 | 3/2006 | Yamakawa et al. |
| 2006/0155950 A1 | 7/2006 | Smith |
| 2008/0155214 A1 | 6/2008 | Shitomi |
| 2010/0095164 A1 | 4/2010 | Kamei et al. |

FOREIGN PATENT DOCUMENTS

| | | |
|---|---|---|
| EP | 1 770 499 A1 | 4/2007 |
| JP | 2006-092322 | 4/2006 |
| JP | 2006-195960 | 7/2006 |
| JP | 2008-159027 | 7/2008 |
| WO | WO-00/41510 | 7/2000 |

OTHER PUBLICATIONS

PCT International Search Report on International Application No. PCT/JP2009/002074 dated Dec. 7, 2009; 3 pages.

*Primary Examiner* — Kevin Verbrugge
(74) *Attorney, Agent, or Firm* — Foley & Lardner LLP

(57) ABSTRACT

A storage system 1000 providing a storage area to an external device 1500 comprises a plurality of storage apparatuses 1100, 1200 and 1300 of different performance capabilities, and a storage controller 2600. The storage controller 2600 holds storage cost coefficients 3202 of the respective storage apparatuses 1100, 1200 and 1300, user cost allocation information 3302 for each user using the storage system 1000 from the external device 1500, and user cost distribution information 3402 that defines, for each user, proportions of an available space amount distributed to the storage apparatuses 1100, 1200 and 1300. The storage controller 2600 calculates an ideal utilization 3502 for each user, from the storage cost coefficients 3202 and the user cost distribution information 3402, and allocates, for each user, the ideal utilization 3502 to each of the storage apparatuses 1100, 1200 and 1300, in the order of the performance capabilities from highest to lowest.

18 Claims, 21 Drawing Sheets

STORAGE SYSTEM AND UTILIZATION MANAGEMENT METHOD FOR STORAGE SYSTEM

CROSS-REFERENCE TO RELATED PATENT APPLICATIONS

This application is a Continuation of U.S. application Ser. No. 12/526,779 (National Stage of PCT/JP2009/002074) filed Aug. 11, 2009, incorporated herein by reference in its entirety

TECHNICAL FIELD

The present invention relates to a storage system and a utilization management method for the storage system, and more particularly to a storage system having a hierarchical structure including plural storage apparatuses and to a utilization management method for the storage system, which are capable of efficient and equitable management of storage resource utilization for each user.

BACKGROUND ART

A network storage apparatus called NAS (network attached storage) is in practical use. NAS has a function of allowing each of plural client devices coupled to a network to access a file stored in the storage apparatus, using a protocol such as NFS (Network File System) or CIFS (Common Internet File System). Some storage apparatuses and file servers using them have a function of limiting utilization of storage resources on a quota basis where the quota is a management unit for a user, group, directory, or the like. PTL 1 discloses a technology used in a network storage system formed of plural network storage apparatuses to limit the utilization of the storage resources.

Storage apparatuses including the NAS vary in the performance level and capacity. Generally, a storage apparatus using a high-speed disk of FC (Fibre Channel), SAS (serial attached SCSI) or the like is high in I/O performance but is costly, which in turn leads to mounting costs for providing large storage capacity. On the other hand, an apparatus using a disk of SATA (serial advanced technology attachment) type, a magnetic tape, or the like is low in I/O performance but is easily provided with large storage capacity at low cost.

A technology called hierarchical storage management (hereinafter called as "HSM") is known as one of technologies for hierarchical coupling and management of these storage apparatuses. Typically, in the HSM, a high-speed storage apparatus with small storage capacity is arranged at a higher level in the hierarchy, and a low-speed storage apparatus with large storage capacity is arranged at a lower level in the hierarchy. The HSM migrates data from a higher-level storage apparatus to a lower-level storage apparatus by using, as a criterion of judgment for the data migration, the frequency of storage resources utilization by users, or the like, and thus achieves an improvement of the utilization efficiency in the storage system. PTL 2 discloses a technology for data migration from one storage apparatus to another, for use in a hierarchical storage system in which plural storage apparatuses are coupled hierarchically.

Also, a technology called GNS (global name space) is known as one of technologies for unified management of the path names or the like of files stored in a storage system formed of plural storage apparatuses. The GNS enables a user to access a file without knowing which of the storage apparatuses the file is actually stored in. PTL 3 discloses a virtualization technology for a NAS file system including the GNS.

CITATION LIST

Patent Literature

[PTL 1]
Japanese Patent Application Laid-open Publication No. 2006-92322
[PTL 2]
Japanese Patent Application Laid-open Publication No. 2006-195960
[PTL 3]
Japanese Patent Application Laid-open Publication No. 2008-159027

SUMMARY OF INVENTION

Technical Problem

Plural storage apparatuses of different data I/O performance capabilities or capacities are used to configure a hierarchical storage system, so the performance, price, or the like per unit storage capacity vary from one storage apparatus to another. Therefore, when the conventional technology is used to set the utilization limits for the hierarchical storage system, there is inequality in performance between a user having data located in a higher-performance storage apparatus at a higher hierarchical level and a user having data located in a lower-performance storage apparatus at a lower hierarchical level, even if the users are allocated the same space amount.

Also, among users of the hierarchical storage system, some users might demand a storage area of a small space amount but of high performance, and some other users might demand a storage area of low performance but of a large space amount. In such a case, it is difficult to make settings individually to meet the needs of each user. One example of such settings is to set, for each user, the limit of the space amount in a storage apparatus at each hierarchical level. In this case, however, a problem arises that the settings become complicated if the hierarchical storage system is formed of a large number of storage apparatuses.

The present invention has been made to solve the foregoing and other problems. An object of the present invention is to provide a storage system having a hierarchical structure including plural storage apparatuses, and a utilization management method for the storage system, which are capable of efficient and equitable management of storage resource utilization for each user.

Solution to Problem

In order to attain the above and other objects, one aspect of the present invention is a storage system being coupled communicatively to an external device and providing a storage area to be used by the external device, the storage system comprising a plurality of storage apparatuses of different performance capabilities, each having a storage medium that provides the storage area; and a storage controller which holds storage cost coefficients of the respective storage apparatuses, the storage cost coefficients being indices of utilization costs required in use of the respective storage apparatuses, and being set in accordance with the performance capabilities of the respective storage apparatuses, user cost allocation information for each user using the storage system from the external device, the user cost allocation information being an index of an available space amount for the user from all of the storage apparatuses, and user cost distribution information that defines, for each user, proportions of the available space amount distributed to the storage apparatuses; wherein the storage controller calculates an ideal utilization for each user, from the storage cost coefficients and the user cost distribution information, the ideal utilization being information indicating ideal utilization allotment of each of the storage apparatuses for the user, and the storage controller allocates, for each user, the ideal utilization to each of the storage apparatuses, in the order of the performance capabilities from highest to lowest.

Advantageous Effects of Invention

The present invention can provide a storage system having a hierarchical structure including plural storage apparatuses, which is capable of efficient and equitable management of storage resource utilization for each user.

BRIEF DESCRIPTION OF DRAWINGS

FIG. 1 is a diagram showing a configuration example of a hierarchical storage system 1000 according to one embodiment of the present invention.
FIG. 2 is a diagram showing a configuration example of a storage apparatus 200 available for use as anyone of storage apparatuses 1100, 1200 and 1300 included in the hierarchical storage system 1000.
FIG. 3 is a diagram showing a configuration example of a computer 10 available for use as a client device 1500 using the hierarchical storage system 1000.
FIG. 4A is a diagram showing a configuration example of a hierarchical storage controller 2000 included in the hierarchical storage system 1000.
FIG. 4B is a diagram showing a configuration example of a hierarchical storage control program 2600.
FIG. 5 is a diagram showing details of a hierarchical storage utilization management table 3000 held in the hierarchical storage controller 2000.
FIG. 6 is a flowchart showing an example of a procedure of available cost initial distribution processing according to Example 1 of the present invention.
FIG. 7 is a flowchart showing an example of a procedure of ideal utilization calculation processing according to Example 1 of the present invention.
FIG. 8 is a flowchart showing an example of a procedure of initial capacity check processing according to Example 1 of the present invention.
FIG. 9 is a flowchart showing an example of a procedure of available cost distribution change processing according to Example 1 of the present invention.
FIG. 10 is a flowchart showing an example of a procedure of capacity change check processing according to Example 1 of the present invention.

FIG. 11 is a flowchart showing an example of a procedure of migration file selection processing according to Example 1 of the present invention.
FIG. 12 is a flowchart showing an example of a procedure of file migration processing according to Example 1 of the present invention.
FIG. 13 is a flowchart showing an example of a procedure of file addition processing according to Example 1 of the present invention.
FIG. 14 is a flowchart showing an example of a procedure of file deletion processing according to Example 1 of the present invention.
FIG. 15 is a flowchart showing an example of a procedure of file-migration-upon-deletion processing according to Example 1 of the present invention.
FIG. 16 is a flowchart showing an example of a procedure of capacity addition processing for the storage apparatus according to Example 1 of the present invention.
FIG. 17 is a diagram showing a configuration example of a de-duplication-capable hierarchical storage system 15000 according to Example 2 of the present invention.
FIG. 18 is a diagram showing a configuration example of a de-duplication-capable hierarchical storage controller 16000 according to Example 2.
FIG. 19 is a diagram showing an example of a file storage condition of the storage apparatus 1200 at the time of de-duplication operation.
FIG. 20 is a diagram showing an example of a file storage condition of the storage apparatus 1100 and the storage apparatus 1200 at the time of de-duplication operation.

DESCRIPTION OF EMBODIMENTS

Figure 1:
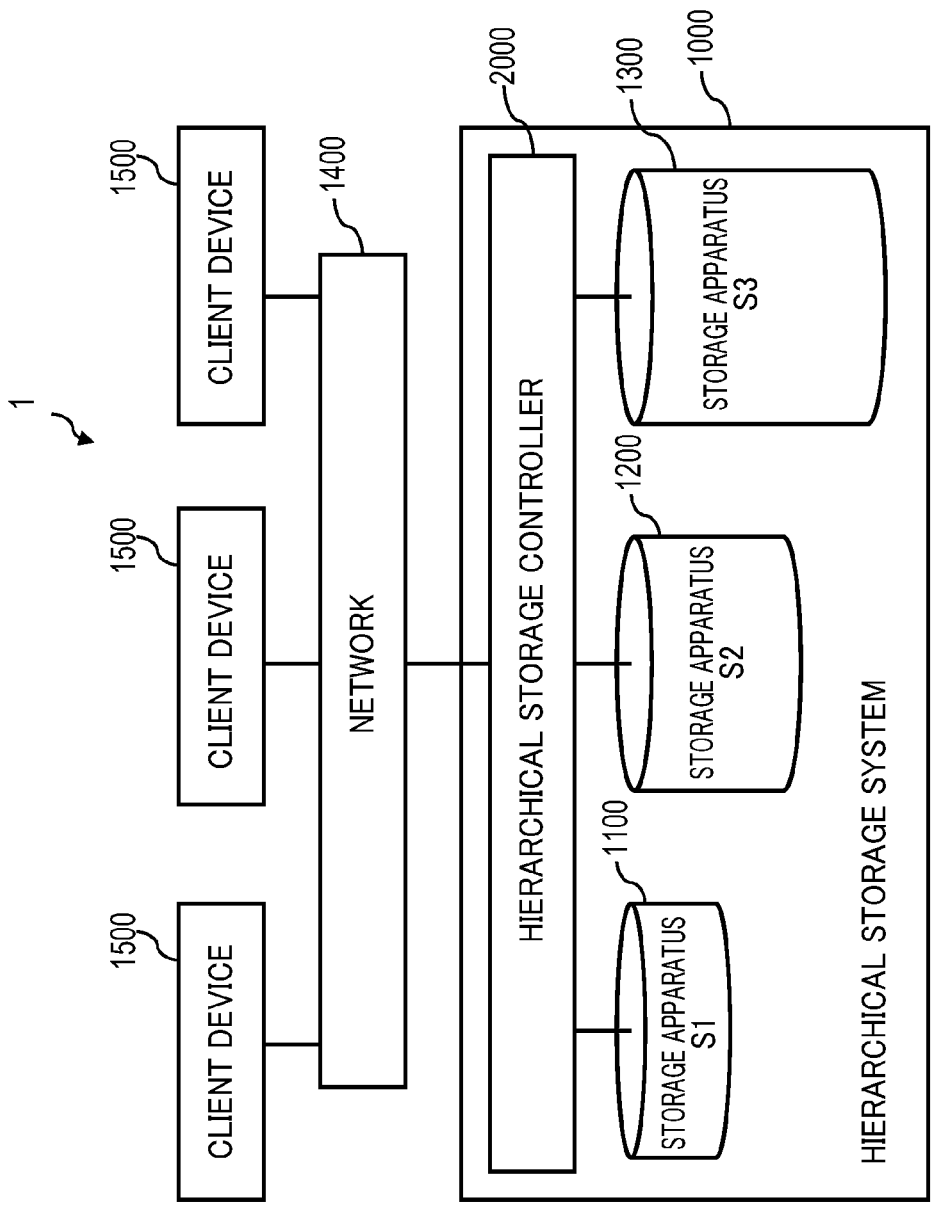
[FIG. 1]

Embodiments for carrying out the present invention will be described below with reference to the drawings. Note that the same structural components are designated by the same reference characters throughout the drawings, and description thereof will be omitted.

EXAMPLE 1

Firstly, description will be given with regard to the configuration, function and effect of the present invention on the basis of one embodiment of the present invention.
Configuration of an Information Processing System 1 According to Example 1
FIG. 1 is a diagram showing an example of the configuration of the information processing system 1 including a hierarchical storage system 1000 according to Example 1 of the present invention. The hierarchical storage system 1000 according to Example 1 includes a storage apparatus 1100 (S1), a storage apparatus 1200 (S2), a storage apparatus 1300 (S3), and a hierarchical storage controller 2000. Note that the reference characters S1 to S3 are employed when the storage apparatuses 1100 to 1300, which form a hierarchical structure, need to be distinguished from one another as storage resources of different performance capabilities and capacities.

The storage apparatus 1100 is a storage apparatus having a storage medium constructed for example of a SAS-type disk, and is high in speed in terms of I/O performance but is relatively small in capacity. The storage apparatus 1200 is a storage apparatus having a storage medium constructed, for example, of a SATA-type disk, and is inferior in I/O performance to the storage apparatus 1100 but is relatively large in capacity. The storage apparatus 1300 is a storage apparatus having a storage medium constructed, for example, of a magnetic tape, and is still lower in speed than the storage apparatus 1200 but provides the largest storage capacity. The storage apparatuses 1100 to 1300 are controlled by the hierarchical storage controller 2000. Note that the hierarchical storage system 1000 according to Example 1 has a three-level hierarchy of the storage apparatuses S1 to S3, but may have a multilevel hierarchy of more than three levels of storage apparatuses.

The hierarchical storage system 1000 is coupled to plural client devices 1500 (or external devices) via a network 1400 such as a LAN (local area network). An administrator and users of the information processing system 1 make access from the client devices 1500 through the network 1400 to the hierarchical storage system 1000 to do the setup of the hierarchical storage system 1000 and the reading and writing of files stored in the storage apparatuses 1100 to 1300 in the hierarchical storage system 1000.

Storage Apparatuses 1100 to 1300

Figure 2:
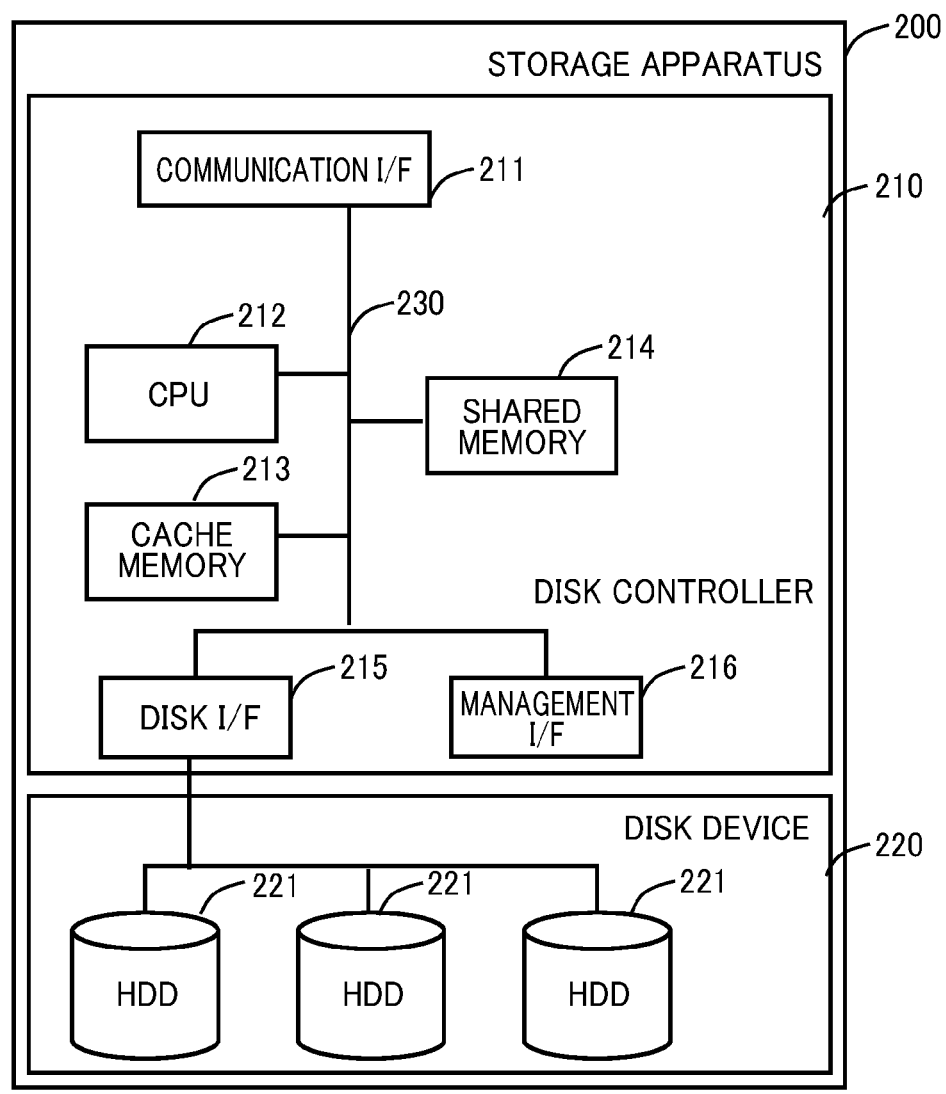
[FIG. 2]

FIG. 2 shows a configuration example of a storage apparatus 200 usable as any one of the storage apparatuses 1100 to 1300. The storage apparatus 200 acts as a subsystem to provide data storage areas to the client devices 1500 included in the information processing system 1. As shown in FIG. 2, the storage apparatus 200 can be configured for example as a RAID (redundant array of independent (or inexpensive) disks) system of a general type organized by a disk device 220 including plural HDDs (hard disk drives) 221. Note that the storage apparatus 200 used in the hierarchical storage system 1000 is used including the mixed HDDs 221 of SAS and SATA types used as interfaces, as mentioned previously. Also, other storage medium such as a magnetic tape or an SSD (solid state drive, semiconductor drive) may be used as appropriate.

The storage apparatus 200 includes the disk device 220, and a disk controller 210 that executes data I/O processing of the disk device 220.

The disk controller 210 includes a communication IF 211, a CPU 212, a cache memory (hereinafter called "CM") 213, a shared memory (hereinafter called "SM") 214, and a disk IF 215, which are communicatively coupled by an internal bus 230.

The CM 213 provides a storage area for temporary storage of data written to the HDD 211 or data read from the HDD 211. The SM 214 stores a program for control of data I/O of the storage apparatus 200, and various management tables used for the control.

The disk IF 215 is a disk adaptor ("DKA") as a communication interface provided to enable communication between the disk controller 210 and the disk device 220. The communication IF 211 has the function of controlling communication with an internal network coupled communicatively with the hierarchical storage controller 2000 to be described later, and is an HBA (host bus adaptor), for example.

Client Devices 1500

Figure 3:
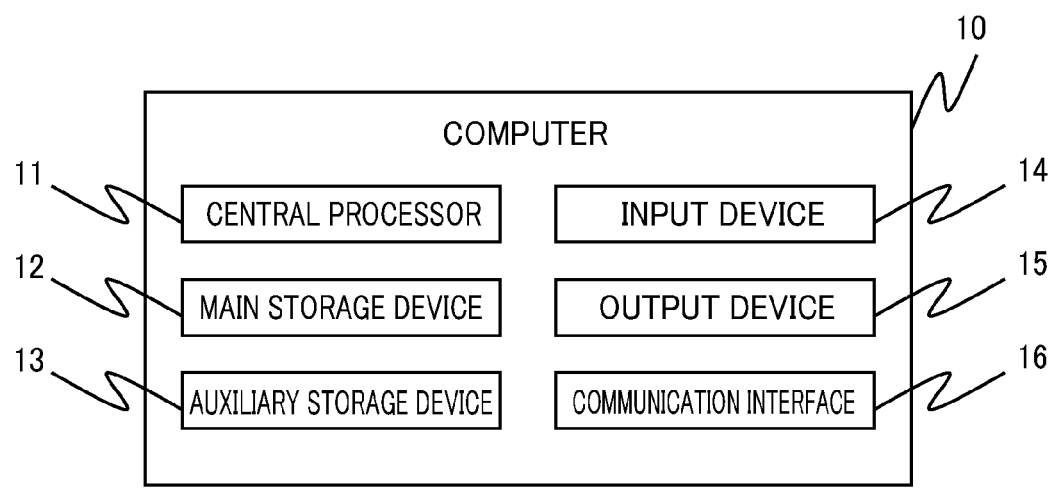
[FIG. 3]

FIG. 3 shows a configuration example of a computer 10 usable as the client devices 1500 coupled to the information processing system 1. The computer 10 includes a central processor 11 (for example, a CPU (central processing unit) or an MPU (micro processing unit), referred to as "CPU" for the sake of simplicity), a main storage device 12 (for example, RAM (random access memory) or ROM (read only memory)), an auxiliary storage device 13 (for example, HDD), an input device 14 (for example, a keyboard or a mouse) that receives user operation input, an output device 15 (for example, a liquid crystal display monitor), and a communication interface 16 (for example, NIC (network interface card) or HBA (host bus adaptor)) that implements communication with other apparatuses.

An operating system (OS) that runs on the computer 10 is not limited to a specific system; however, an operating system based on, for example, UNIX (registered trademark) is preferably used. Also, the client device 1500 has implemented therein a hierarchical storage control client program, which allows the user or administrator to gain access to a hierarchical storage control program 2600 of the hierarchical storage controller 2000 via the input device 14 and the output device 15 to perform the initialization and reset of a hierarchical storage utilization management table 3000 to be described later. Alternatively, any one of the client devices 1500 may be configured as a dedicated manager of the hierarchical storage system 1000.

Hierarchical Storage Controller 2000

Figure 4A:
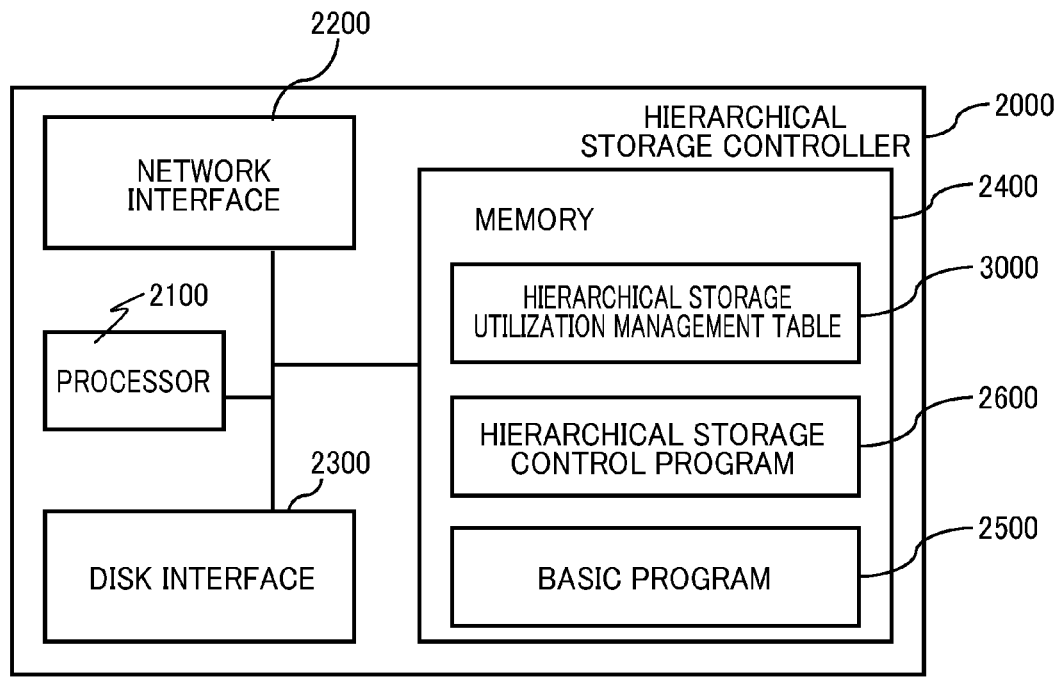
[FIG. 4A]

FIG. 4A shows a configuration example of the hierarchical storage controller 2000 provided in the hierarchical storage system 1000. The hierarchical storage controller 2000 includes a processor 2100 configured of CPU, MPU or the like, a network interface 2200, a disk interface 2300, and a memory 2400.

The hierarchical storage controller 2000 is communicatively coupled to the client devices 1500 through the network interface 2200 that is for example NIC, and the network 1400 that is for example LAN. Also, the hierarchical storage controller 2000 is communicatively coupled to the storage apparatuses 1100 to 1300 through the disk interface 2300. Note that the disk interface 2300 may be a communication interface such as HBA when coupled to the storage apparatus 200 having the configuration shown for example in FIG. 2. Also, the hierarchical storage controller 2000 may be configured to also have the function of the disk controller 210 of the storage apparatus 200.

The memory 2400 formed of RAM, ROM or the like stores an OS that is for example UNIX (registered trademark), a basic program 2500 that is a conventional storage management program, a hierarchical storage control program 2600 for control of the hierarchical storage system 1000 according to Example 1, and the hierarchical storage utilization management table 3000 for use in execution of the hierarchical storage control program 2600.

The hierarchical storage controller 2000 controls the function of the overall hierarchical storage system 1000 by the basic program 2500 and the hierarchical storage control program 2600 being loaded and executed by the CPU 2100.

Hierarchical Storage Control Program 2600

Figure 4B:
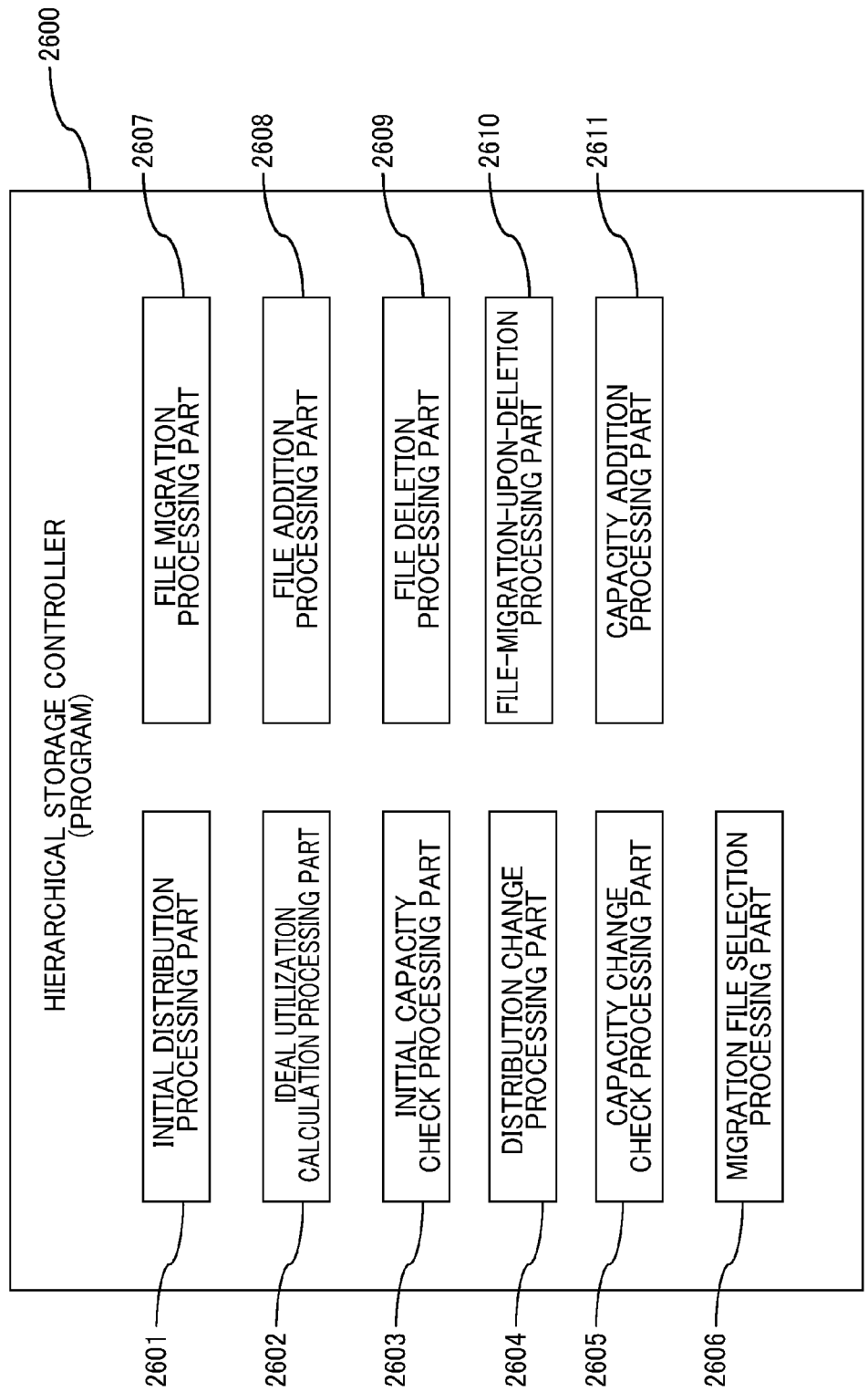
[FIG. 4B]

FIG. 4B shows a configuration example of the hierarchical storage control program 2600 (or the storage controller). The hierarchical storage control program 2600 according to Example 1 is configured of programs for implementing the functions of the following functional blocks: an initial distribution processing part 2601, an ideal utilization calculation processing part 2602, an initial capacity check processing part 2603, a distribution change processing part 2604, a capacity change check processing part 2605, a migration file selection processing part 2606, a file migration processing part 2607, a file addition processing part 2608, a file deletion processing part 2609, a file-migration-upon-deletion processing part 2610, and a capacity addition processing part 2611. The specific functions performed by these functional blocks will be described later with reference to flowcharts showing processing flows.

It should be noted that the hierarchical storage control program 2600 does not necessarily need to be configured as divided into these functional blocks. The hierarchical storage control program 2600 may have any configuration as long as the hierarchical storage control program 2600 performs, as a whole, the functions of Example 1. Also, as mentioned above, the functions performed by the programs are herein referred to as "XX parts" as simulated in the case of hardware.

Hierarchical Storage Utilization Management Table 3000

Figure 5:
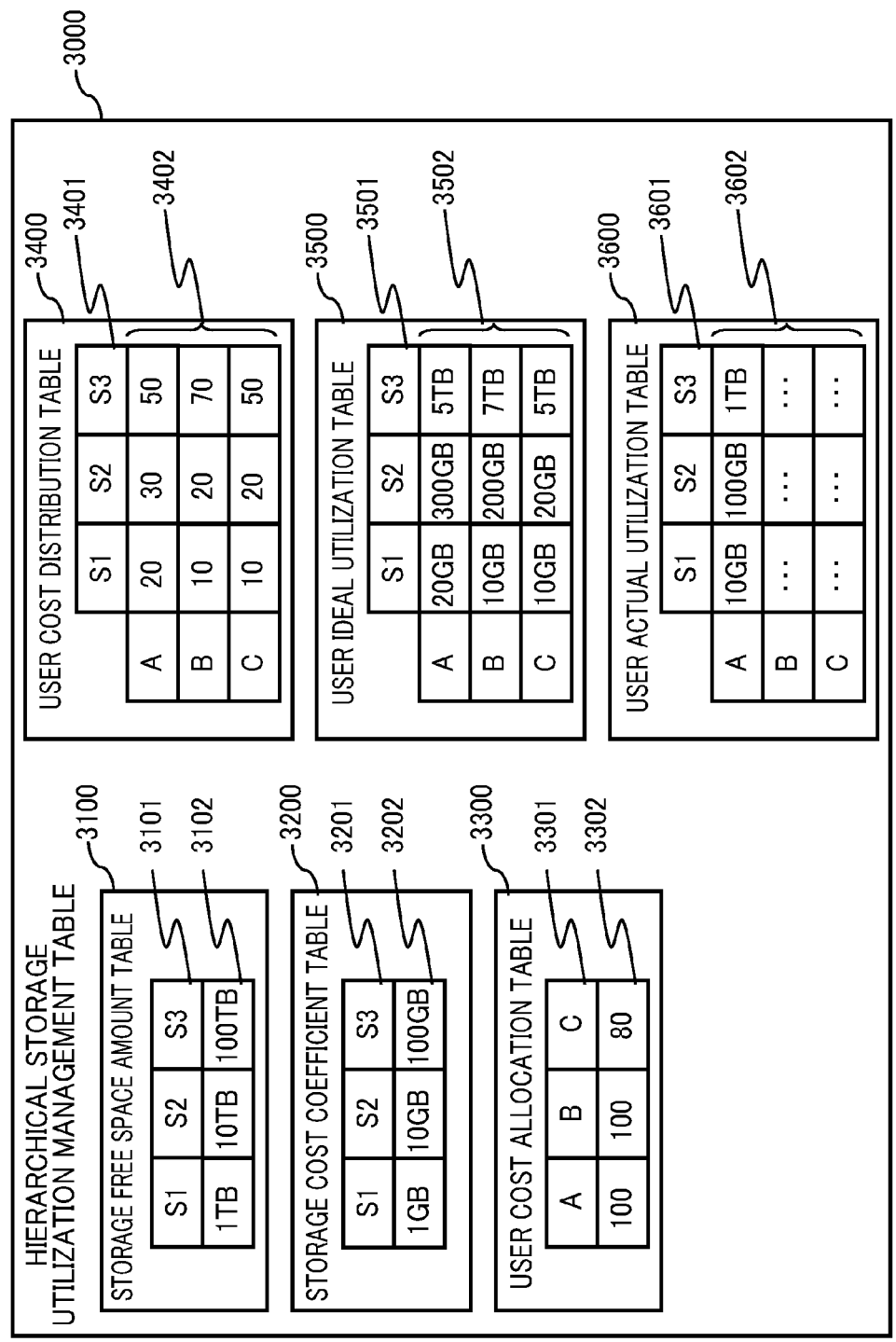
[FIG. 5]

FIG. 5 shows a configuration example of the hierarchical storage utilization management table 3000. The hierarchical storage utilization management table 3000 stores data referred to by the hierarchical storage control program 2600 at the time of processing execution. The hierarchical storage utilization management table 3000 is configured by including a storage free space amount table 3100, a storage cost coefficient table 3200, a user cost allocation table 3300, a user cost distribution table 3400, a user ideal utilization table 3500, and a user actual utilization table 3600.

The storage free space amount table 3100 has a storage apparatus ID column 3101 and a free space amount column 3102. The storage apparatus ID column 3101 records storage apparatus IDs S1 to S3 as identifications for identifying the storage apparatuses 1100 to 1300 that form the hierarchical storage system 1000. The free space amount column 3102 records a free space amount 3200 of each of the storage apparatuses S1 to S3 in, for example, terabyte (TB).

The free space amounts of the storage apparatuses S1 to S3 are acquired from the storage apparatuses S1 to S3, respectively, by, for example, the basic program 2500 of the hierarchical storage controller 2000.

Storage Cost Coefficient Table 3200

The storage cost coefficient table 3200 stores a space amount, per unit cost, in each of the storage apparatuses, which is permitted to a user. Costs are allocated to each user by the administrator. The storage cost coefficient table 3200 has a storage apparatus ID column 3201 and a storage cost coefficient column 3202.

For example, in Example 1, space amounts in the respective storage apparatuses permitted to users are preset per unit cost as the following: 1 GB in the storage apparatus S1 (1100), 10 GB in the storage apparatus S2 (1200), and 100 GB in the storage apparatus S3 (1300). In this instance, setting is such that the storage apparatuses S1, S2 and S3 is higher in performance and is higher in cost per capacity in this order.

The values of the storage cost coefficient table 3200 can be set by the administrator based on, for example, a bit price ratio determined by dividing the capacities of the storage apparatuses S1 to S3 by the obtained money amount, or on a catalog spec performance ratio. Alternatively, the hierarchical storage controller 2000 may use for example the basic program 2500 to actually measure the I/O performance of each of the storage apparatuses S1 to S3. In this case, values obtained by normalizing the performance ratio of each storage apparatus may be set. In the normalization, the lowest measured value of the storage apparatus is taken as a reference.

User Cost Allocation Table 3300

The user cost allocation table 3300 stores, for each user, available costs allocated to each user by the administrator. The user cost allocation table 3300 has a user ID column 3301 as identification for identifying the users and an available cost column 3302. The available cost column 3302 is set by the administrator based on, for example, fees paid by users A to C. As shown in an example of FIG. 5, the available cost for the user C is set to 80% of the available costs for the users A and B.

User Cost Distribution Table 3400

The user cost distribution table 3400 stores the available costs distributed to the storage apparatuses S1 to S3 by the users A to C. The user cost distribution table 3400 has a storage apparatus ID column 3401 and a distribution cost column 3402 indicating the distribution costs allocated to each of the storage apparatuses S1 to S3 by the users A to C.

The user cost distribution table 3400 is set according to the needs of each individual user within the distribution costs allocated to the user A, B, or C, stored in the user cost allocation table 3300. Note that the initial values of the user cost distribution table 3400 may be set by the hierarchical storage controller 2000 on the setup of the user cost allocation table 3300 by the administrator. Specifically, the initial values may be obtained by dividing the distribution costs allocated to the user into the number of the storage apparatuses S1 to S3 (dividing the distribution costs into three equal parts in the case of Example 1).

User Ideal Utilization Table 3500

For each of the storage apparatuses S1 to S3, the user ideal utilization table 3500 stores a user ideal utilization available for each of the users A to C. The user ideal utilization table 3500 is used by the hierarchical storage controller 2000 to limit the utilization of the hierarchical storage system 1000. The user ideal utilization table 3500 has a storage apparatus ID column 3501 and an ideal utilization column 3502 set for the storage apparatuses S1 to S3 for each of the users A to C. Details of setting of the values of the user ideal utilization table 3500 and a procedure for changing the values will be described later.

User Actual Utilization Table 3600

User actual utilization table 3600 stores the space amounts of the storage areas actually used by the users for each of the storage apparatuses S1 to S3. The user actual utilization table 3600 has a storage apparatus ID column 3601 and an actual utilization column 3602 indicating the actual utilization of the storage apparatuses S1 to S3 for each of the users A to C. The actual utilizations of the respective storage apparatuses S1 to S3 by each of the users A to C are acquired from the respective storage apparatuses S1 to S3 by, for example, the basic program 2500 of the hierarchical storage controller 2000.

Processing Flow Executed by the Hierarchical Storage System 1000

Description will be given below with reference to flowcharts showing available cost initial distribution processing, available cost distribution changing processing, file addition processing, file deletion processing, and processing performed after capacity is added to the storage apparatuses S1 to S3, all of which are executed in the hierarchical storage system 1000 according to Example 1. As described in connection with FIG. 4B, these processing are implemented as the hierarchical storage control program 2600 and executed by the hierarchical storage controller 2000. Note that a conventional storage apparatus control processing having no direct relation to the configuration of the present invention is assumed to be implemented in the basic program 2500, and description will be omitted. In each flowchart, the reference character S denotes "step".

Available Cost Initial Distribution Processing

Figure 6:
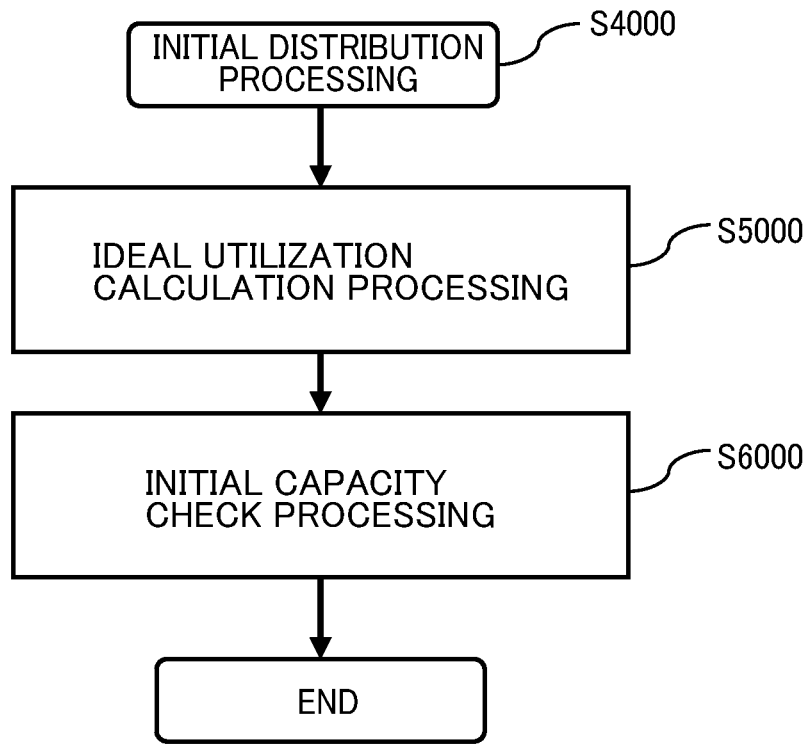
[FIG. 6]

FIG. 6 is a flowchart showing an example of a procedure of the available cost initial distribution processing according to Example 1. This processing is executed by the initial distribution processing part 2601 of the hierarchical storage control program 2600 when the user or administrator initializes the available cost distribution through the client device 1500.

The available cost initial distribution processing (S4000) involves executions of, first, the ideal utilization calculation processing (S5000), and then, the initial capacity check processing (S6000). Each processing step will be described later.

Ideal Utilization Calculation Processing

Figure 7:
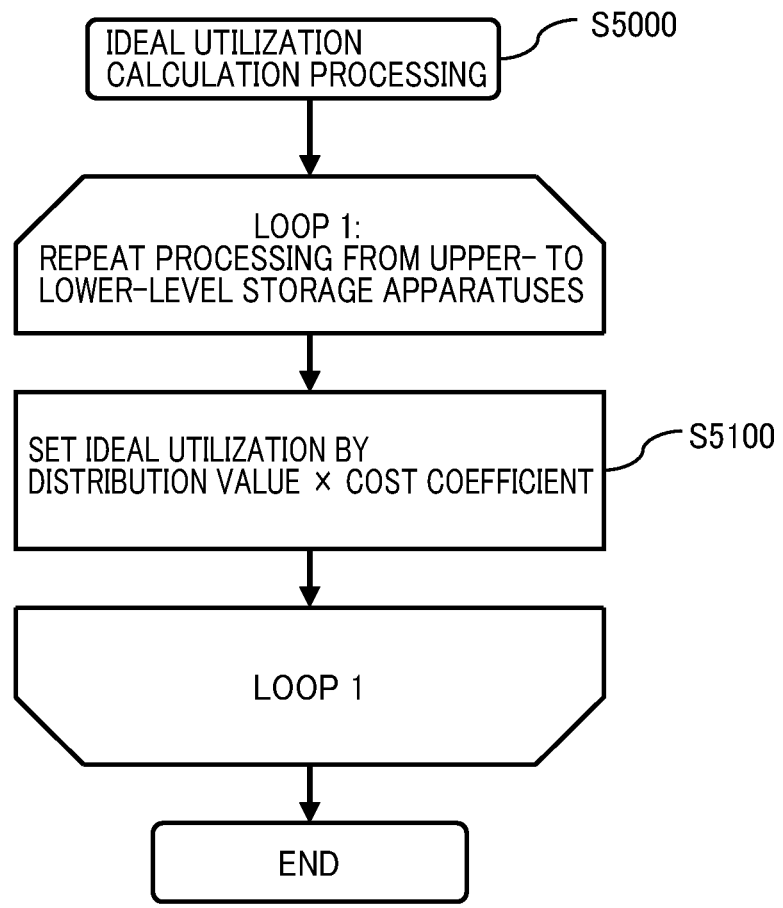
[FIG. 7]

FIG. 7 is a flowchart showing an example of a procedure of the ideal utilization calculation processing. The ideal utilization calculation processing (S5000) is executed by the ideal utilization calculation processing part 2602 of the hierarchical storage controller 2600. In the processing (S5000), processing (S5100) for setting the ideal utilization 3502 of each of the storage apparatuses S1 to S3 stored in the user ideal utilization table 3500 is repeated for all the storage apparatus from the higher level to the lower level (in the order from the storage apparatus S1 to S3, in the case of Example 1). In the processing (S5100), the ideal utilization 3502 is obtained by multiplying the administrator-set cost coefficient 3202 stored in the storage cost coefficient table 3200, by the distribution cost 3402 which is available distribution information distributed by the user and which is stored in the user cost distribution table 3400.

Initial Capacity Check Processing

Figure 8:
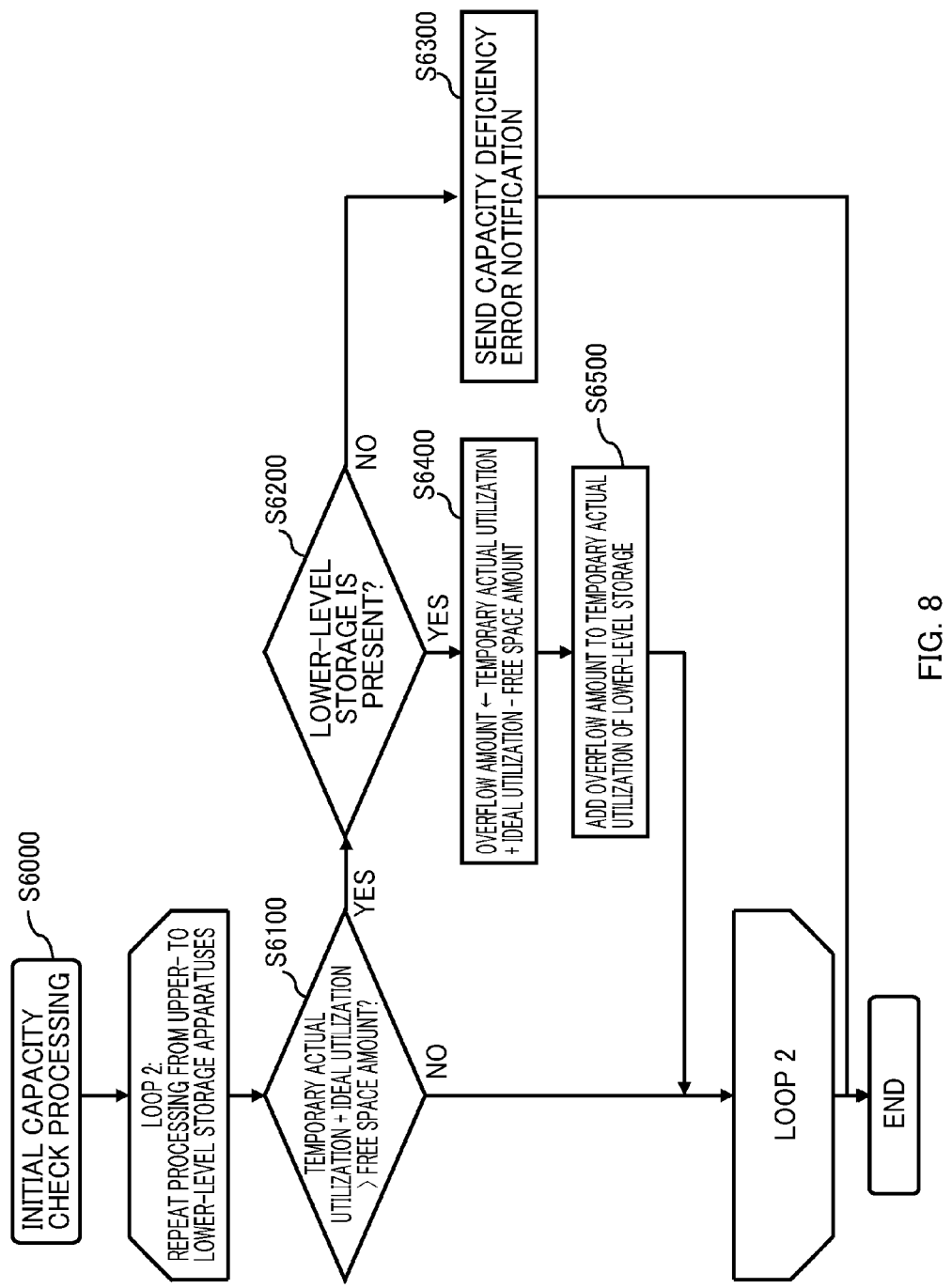
[FIG. 8]

FIG. 8 is a flowchart showing an example of a procedure of the initial capacity check processing. The procedure is executed by the initial capacity check processing part 2603 of the hierarchical storage controller 2600. In the procedure, temporary variables called a temporary actual utilization of each of the storage apparatuses S1 to S3 and an overflow amount are used. Their initial values are zero. In the initial capacity check processing (S6000), the following procedure is repeated for all the storage apparatuses S1 to S3 from the higher level to the lower level. First, a judgment is made as to whether a value obtained by adding the temporary actual utilization of the target storage apparatus S1, S2, or S3 to the user's ideal utilization of the target storage apparatus S1, S2, or S3 stored in the user ideal utilization table 3500 is larger than the free space amount of the target storage apparatus S1, S2, or S3 stored in the storage free space amount table 3100 (S6100).

If the value obtained by adding the temporary actual utilization to the ideal utilization is equal to or smaller than the free space amount (No at S6100), the processing is next performed on the storage apparatus at the next level. If the value obtained by adding the temporary actual utilization to the ideal utilization is larger than the free space amount (Yes at S6100), a judgment is made as to whether there is a storage apparatus at a lower level (S6200). If there is no storage apparatus at the lower level (No at S6200), files of the total amount of the ideal utilizations, which are determined by the specified available cost distribution, cannot be stored with the current free space amount of each of the storage apparatuses S1 to S3. Accordingly, the user or administrator is notified of a space amount shortage error through, for example, the output device 15 of the client device 1500 (S6300), and the processing ends. If there is any storage apparatus at the lower level (Yes at S6200), the overflow amount is obtained by subtracting the free space amount from the value obtained by adding the temporary actual utilization to the ideal utilization (S6400). Then, the overflow amount is added to the temporary actual utilization of the storage apparatus S2 or S3 at the next lower level (S6500). The processing is next performed on the storage apparatus at the next level.

By the above-described available cost initial distribution processing, the hierarchical storage controller 2000 calculates the ideal utilization from the given available cost distribution, and checks whether the files of the total amount of the calculated ideal utilizations can be stored with the current free space amount of each of the storage apparatuses. If the files of the total amount of the ideal utilizations cannot be stored, the user or administrator is notified of the space amount shortage error.

Note that the hierarchical storage controller 2000 may notify only the administrator of the space amount shortage error as an alert and permit the setting of the user ideal utilization table 3500. In this instance, while proceeding with the operation of the hierarchical storage system 1000, the administrator may take measures, such as addition of storage capacity, before the user A to C actually adds a file to actually cause an error due to the space amount shortage.

Available Cost Distribution Change Processing

Figure 9:
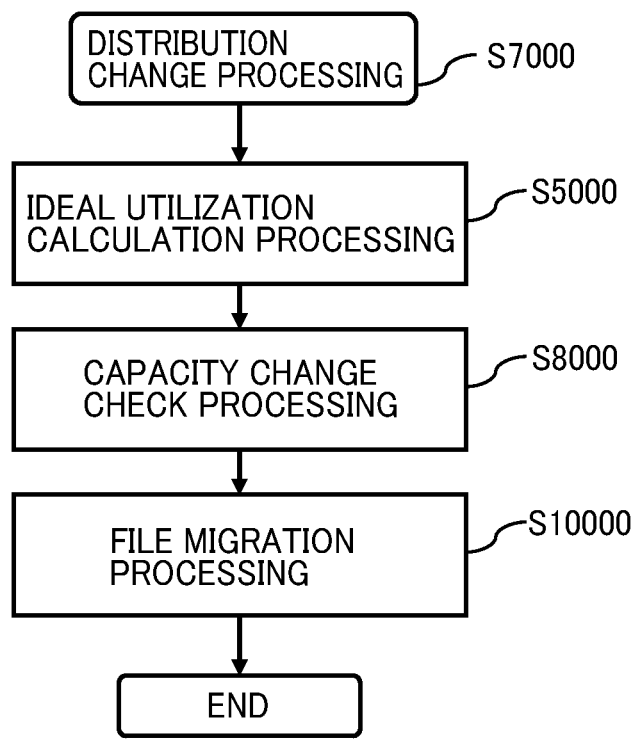
[FIG. 9]

FIG. 9 is a flowchart showing an example of a procedure of the available cost distribution change processing according to Example 1. The processing is executed by the distribution change processing part 2604 of the hierarchical storage controller 2600 when the user or administrator changes the available cost distribution through the client device 1500 on a user basis. The available cost distribution change processing (S7000) involves executions of, first, the ideal utilization calculation processing (S5000), then, the capacity change check processing (S8000), and finally, the file migration processing (S10000). Each processing step will be described later.

Capacity Change Check Processing

Figure 10:
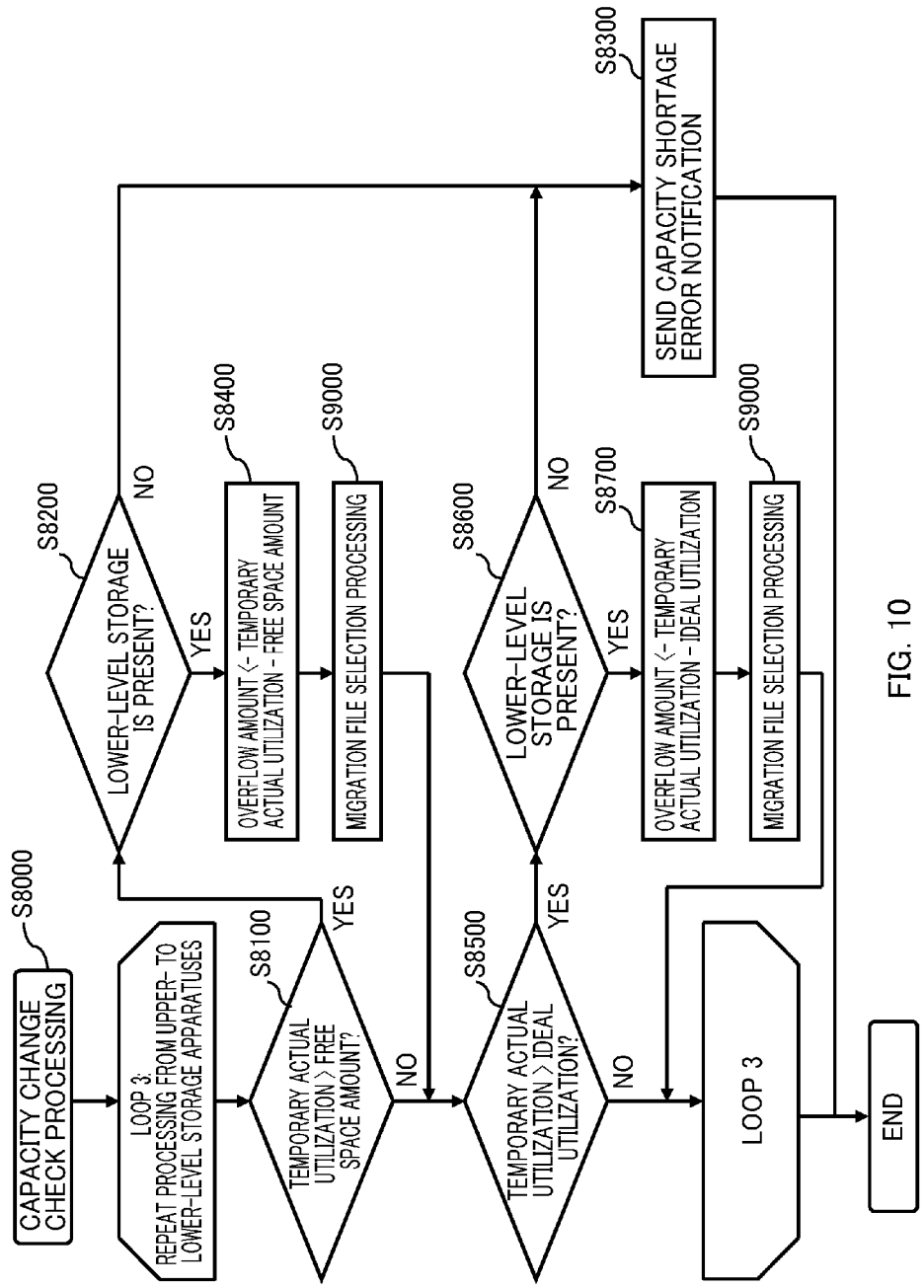
[FIG. 10]

FIG. 10 is a flowchart showing an example of a procedure of the capacity change check processing. The procedure is executed by the capacity change check processing part 2605 of the hierarchical storage controller 2600. In this procedure, temporary variables called temporary utilization of each of the storage apparatuses S1 to S3 and an overflow amount are used. The initial value of the temporary utilization is the user's actual utilization of the storage apparatus stored in the user actual utilization table 3600, and the initial value of the overflow amount is zero. In the capacity change check processing (S8000), the following procedure is repeated for all the storage apparatuses S1 to S3 from the higher level to the lower level.

First, a judgment is made as to whether the temporary actual utilization of the target storage apparatus is larger than the free space amount of the target storage apparatus stored in the storage free space amount table 3100 (S8100). If the temporary actual utilization is larger than the free space amount (Yes at S8100), a judgment is made as to whether there is a storage apparatus at a still lower level (S8200). If there is no storage apparatus at the lower level (No at S8200), the user or administrator is notified of a space amount shortage error through, for example, the output device 15 of the client device 1500 (S8300), and the processing ends. If there is any storage apparatus at the lower level (Yes at S8200), the overflow amount is obtained by subtracting the free space amount from the temporary actual utilization (S8400), and the migration file selection processing to be described later is executed (S9000). Then, the processing goes to the same processing (S8500) as that executed when, at the first judgment step (S8100), the temporary actual utilization is judged to be equal to or smaller than the free space amount.

If at the first judgment step (S8100) the temporary actual utilization is judged to be equal to or smaller than the free space amount (No at S8100), a judgment is made as to whether the temporary actual utilization of the target storage apparatus S1, S2, or S3 is larger than the user's ideal utilization 3502 of the target storage apparatus stored in the user ideal utilization table 3500 (S8500). If the temporary actual utilization is larger than the ideal utilization (Yes at S8500), a judgment is made as to whether there is a storage apparatus at a still lower level (S8600). If there is no storage apparatus at the lower level (No at S8600), the user or administrator is notified of a space amount shortage error through, for example, the output device 15 of the client device 1500 (S8300), and the processing ends. If there is any storage apparatus at the lower level (Yes at S8600), the overflow amount is obtained by subtracting the ideal utilization from the temporary actual utilization (S8700), and the migration file selection processing to be described later is executed (S9000). Then, the processing goes to the processing for the storage apparatus at the next level.

Migration File Selection Processing

Figure 11:
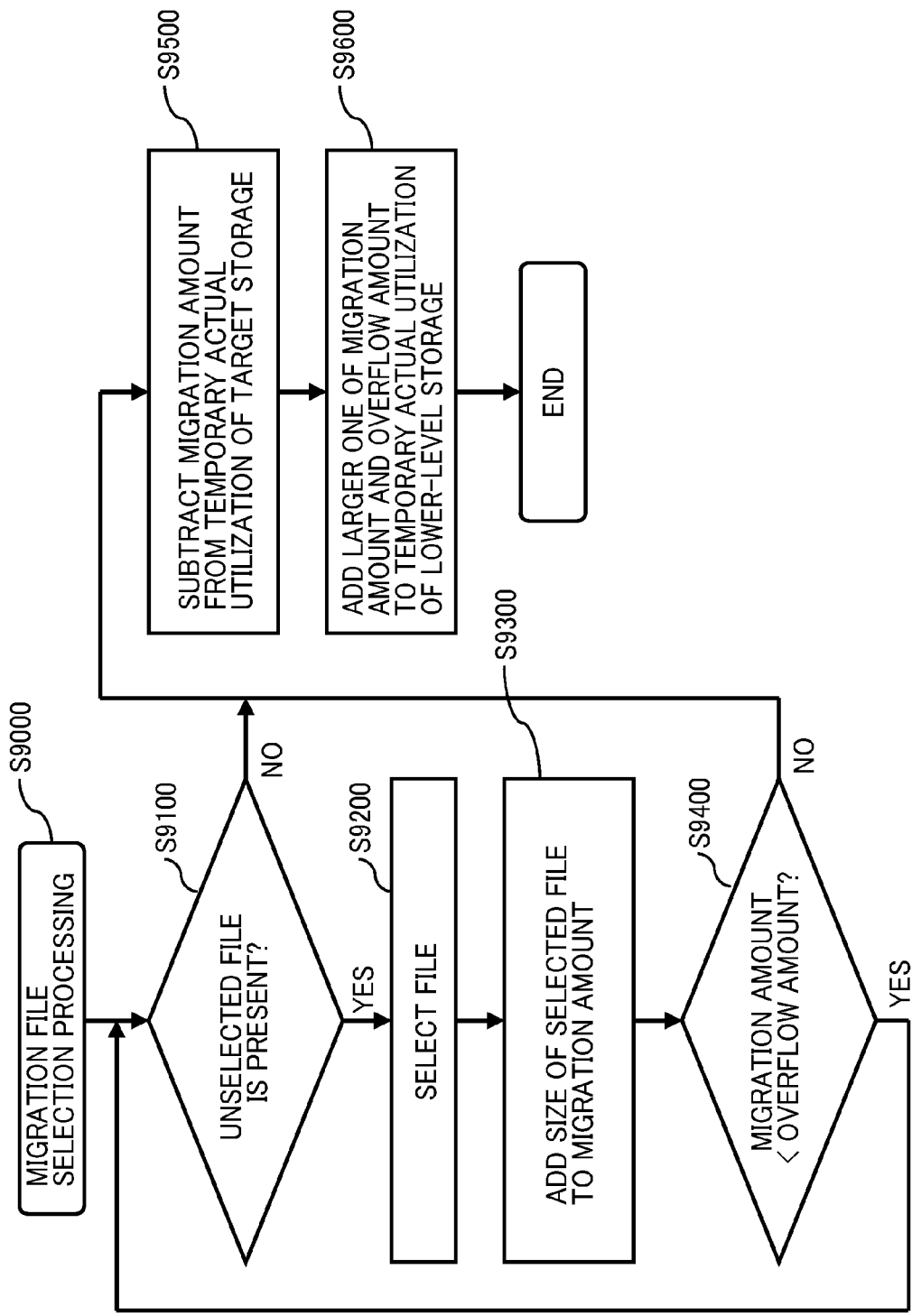
[FIG. 11]

FIG. 11 is a flowchart showing an example of a procedure of the migration file selection processing. The procedure is executed by the migration file selection processing part 2606 of the hierarchical storage controller 2600. In this procedure, the overflow amount is received as an execution argument from the preceding procedure, and a temporary variable called a migration amount is used. The initial value of the migration amount is zero. In the migration file selection processing (S9000), first, a judgment is made as to whether there is any unselected file not selected as a target of migration in files stored in the target storage apparatus S1, S2, or S3 (S9100). At the first time of execution of the procedure, all files stored in the target storage apparatus S1, S2, or S3 are in an unselected state.

If there is any unselected file (Yes at S9100), one file is selected from among the unselected files, as a target file to be migrated (S9200). The file may be selected according to any criterion defined by the administrator or user; however, here, the least recently accessed file that has not been recently used is selected. Then, the size of the selected file is added to the migration amount (S9300), and whether the migration amount is smaller than the overflow amount is judged (S9400). If the migration amount is smaller than the overflow amount (Yes at S9400), the processing returns to the first judgment step (S9100) to select another file targeted for migration. If the migration amount is equal to or larger than the overflow amount (No at S9400), the processing goes to the same processing (S9500) as that executed when, at the first judgment step (S9100), there is no unselected file.

If at the first judgment step (S9100) there is no unselected file (No at S9100), the migration amount is subtracted from the temporary actual utilization of the target storage apparatus (S9500). Then, the larger one between the migration amount and the overflow amount is added to the temporary actual utilization of the storage apparatus at the immediate lower level (S9600), and the processing ends. With such a configuration, in each storage apparatus, files of an appropriate amount by which the actual utilization exceeds the ideal utilization are selected so as to be migrated to the storage apparatus at the still lower level.

File Migration Processing

Figure 12:
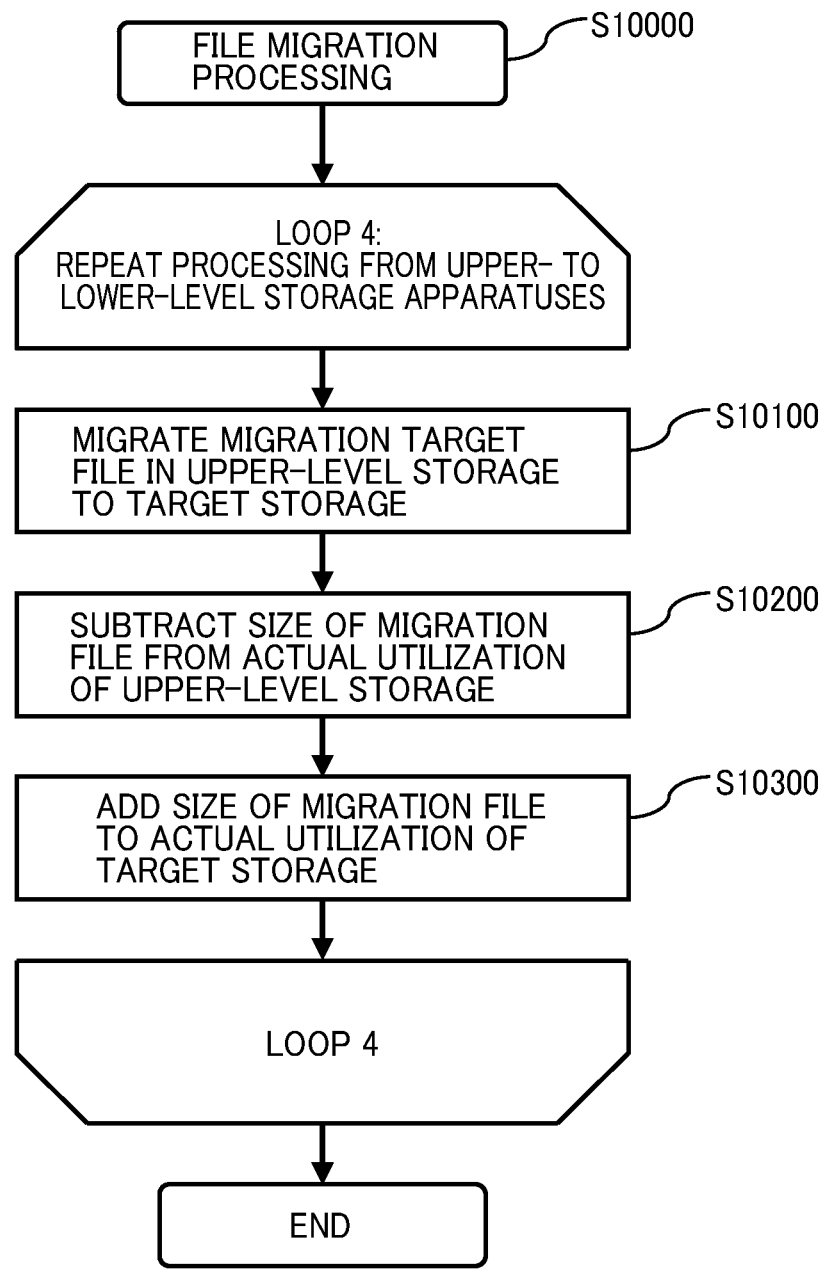
[FIG. 12]

FIG. 12 is a flowchart showing an example of a procedure of the file migration processing. The file migration processing (S10000) is executed by the file migration processing part 2607 of the hierarchical storage controller 2600. In this procedure, the following procedure is repeated for all the storage apparatuses S1 to S3 from the higher level to the lower level. First, migration target files are migrated to the target storage apparatus from the storage apparatus at the immediate higher level (S10100). At this time, the free space amounts of the migration-related storage apparatuses stored in the storage free space amount table 3100 are increased and reduced, respectively, by the size of the migration target files. Next, the size of the migration target files is subtracted from the user's actual utilization of the storage apparatus at the immediate higher level, stored in the user actual utilization table 3600 (S10200). Finally, the size of the migration target files is added to the user's actual utilization of the target storage apparatus stored in the user actual utilization table 3600 (S10300).

By the above-described available cost distribution change processing, when the available cost distribution is changed on a user basis, the hierarchical storage controller 2000 checks whether the files already stored in the hierarchical storage system 1000 can also be stored in the changed setting. If the files cannot be stored in the changed setting, the hierarchical storage controller 2000 does not permit the setting change.

File Addition Processing

Figure 13:
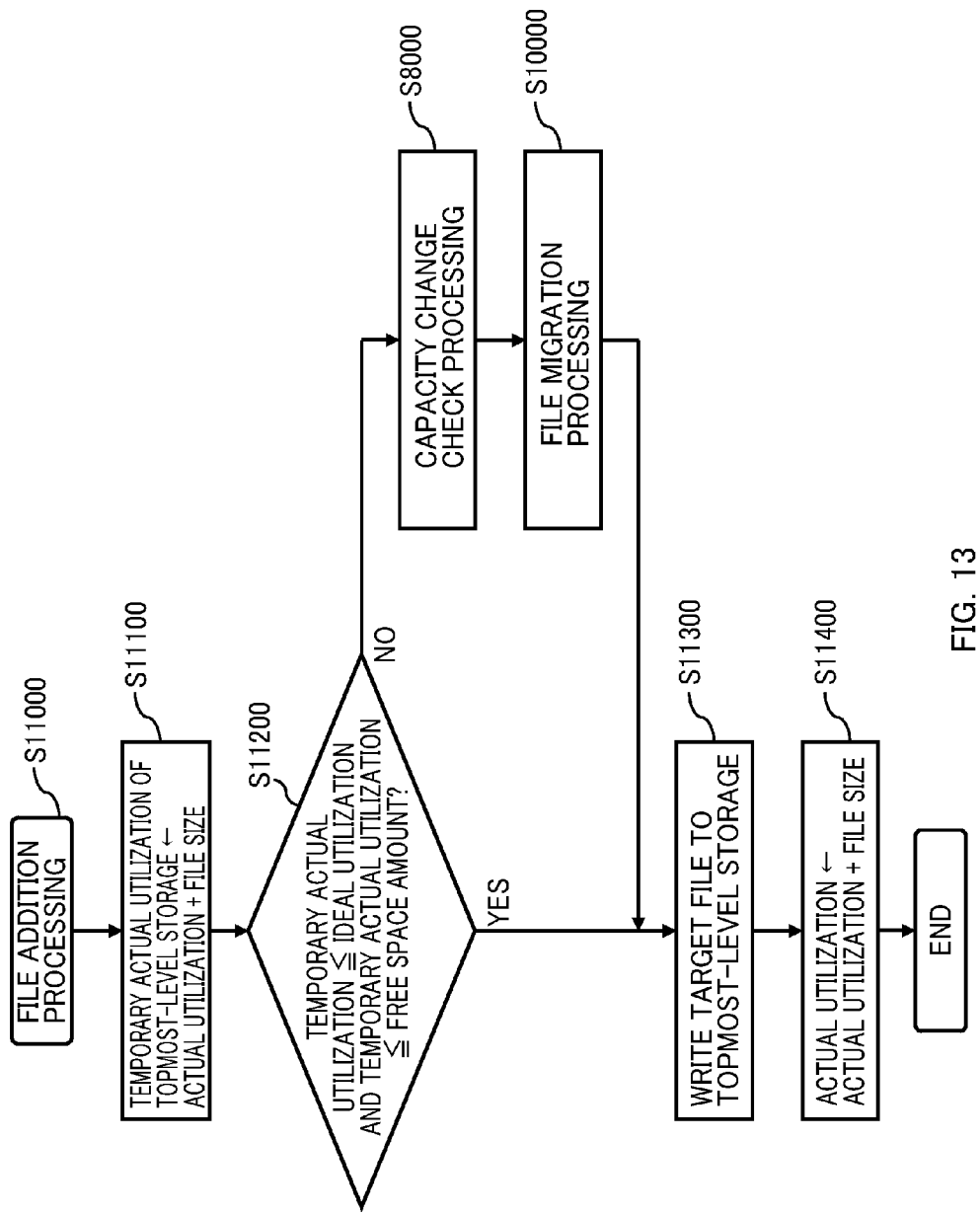
[FIG. 13]

FIG. 13 is a flowchart showing an example of a procedure of the file addition processing according to Example 1. The procedure is executed by the file addition processing part 2608 of the hierarchical storage controller 2600. In this procedure, a temporary variable called a temporary actual utilization of each of the storage apparatuses is used. The initial value of the temporary actual utilization is the user's actual utilization of the target storage apparatus stored in the user actual utilization table 3600. In the file addition processing (S11000), first, the size of an addition target file is added to the temporary actual utilization of the highest-level storage apparatus (S11100). Then, a judgment is made as to whether the temporary actual utilization is equal to or less than the user's ideal utilization 3502 of the storage apparatus stored in the user ideal utilization table 3500 and also is equal to or less than the free space amount of the storage apparatus stored in the storage free space amount table 3100 (S11200).

If the above condition is not satisfied (No at S11200), the capacity change check processing (S8000) and the file migration processing (S10000) are executed. Thereafter, the processing goes to the same processing as that executed when the condition is satisfied. If the condition is satisfied, the addition target file is written to the storage apparatus at the highest-level (S11300). At this time, the free space amount 3101 of the storage apparatus stored in the storage free space amount table 3100 is reduced by the size of the addition target file. Finally, the size of the addition target file is added to the user's actual utilization of the storage apparatus stored in the user actual utilization table 3600 (S11400).

By the above-mentioned file addition processing, the hierarchical storage controller 2000 executes the capacity change check processing (S8000) to check whether the file of a size beyond the limits of the storage free space amount table 3100 and the user ideal utilization table 3500 can be added. Then, if the file addition would cause space amount shortage, the hierarchical storage controller 2000 makes a notification of such error and does not permit the file addition.

File Deletion Processing

Figure 14:
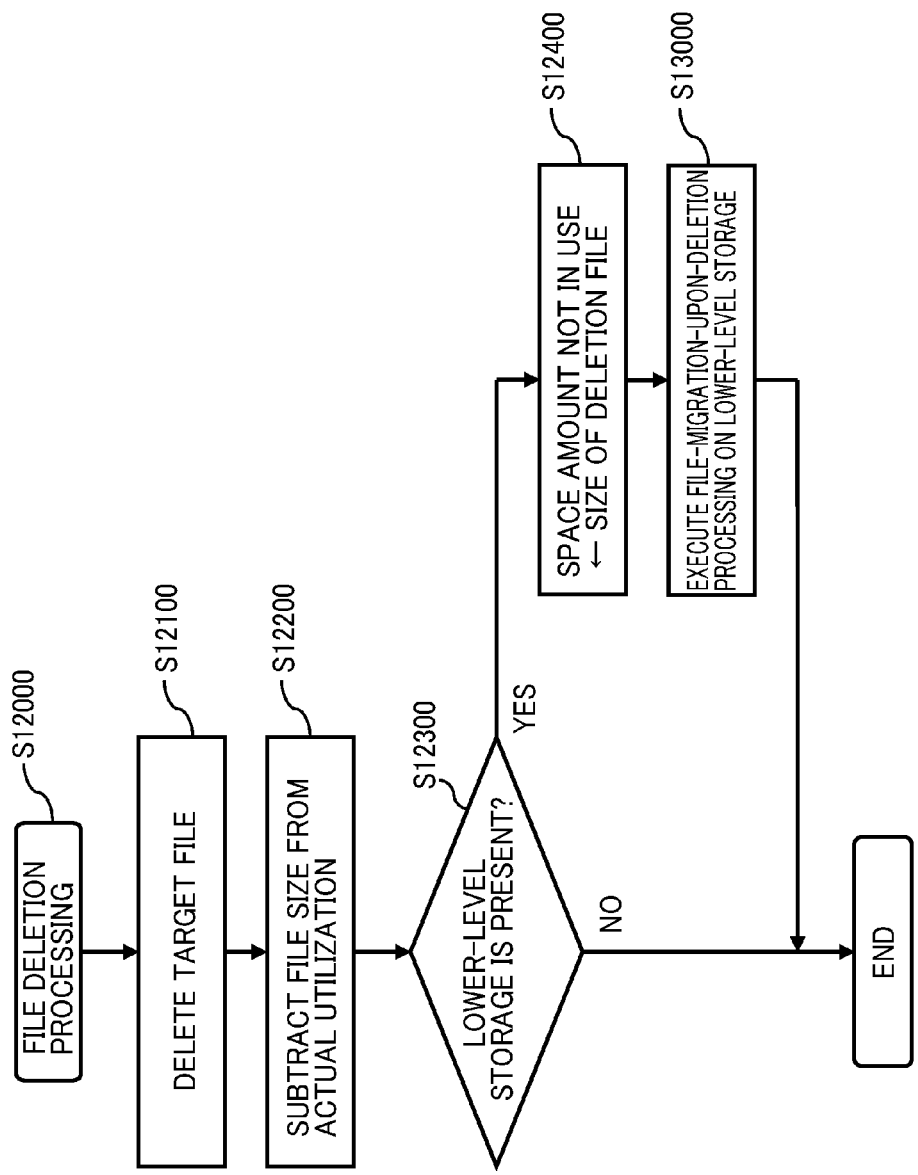
[FIG. 14]

FIG. 14 is a flowchart showing an example of a procedure of the file deletion processing according to Example 1. The procedure is executed by the file deletion processing part 2609 of the hierarchical storage controller 2600. In this procedure, a temporary variable called a space amount not in use is used. The initial value of the space amount not in use is zero. In the file deletion processing (S12000), first, through the input device 14 of the client device 1500, a deletion target file specified by the user or administrator is deleted from the storage apparatus S1, S2, or S3 that stores the deletion target file (S12100). At this time, the free space amount 3101 of the storage apparatus S1, S2, or S3 stored in the storage free space amount table 3100 is increased by the size of the deletion target file. Then, the size of the deletion target file is subtracted from the user's actual utilization of the storage apparatus stored in the user actual utilization table 3600 (S12200).

Then, a judgment is made as to whether there is any storage apparatus at a lower level (S12300). If there is no storage apparatus at the lower level (No at S12300), the processing ends. If there is any storage apparatus at the lower level (Yes at S12300), the size of the deletion target file is set as the space amount not in use (S12400). Then, the file-migration-upon-deletion processing (S13000) to be described later is executed on the storage apparatus of the immediate lower level, and the processing ends.

File-migration-upon-deletion Processing

Figure 15:
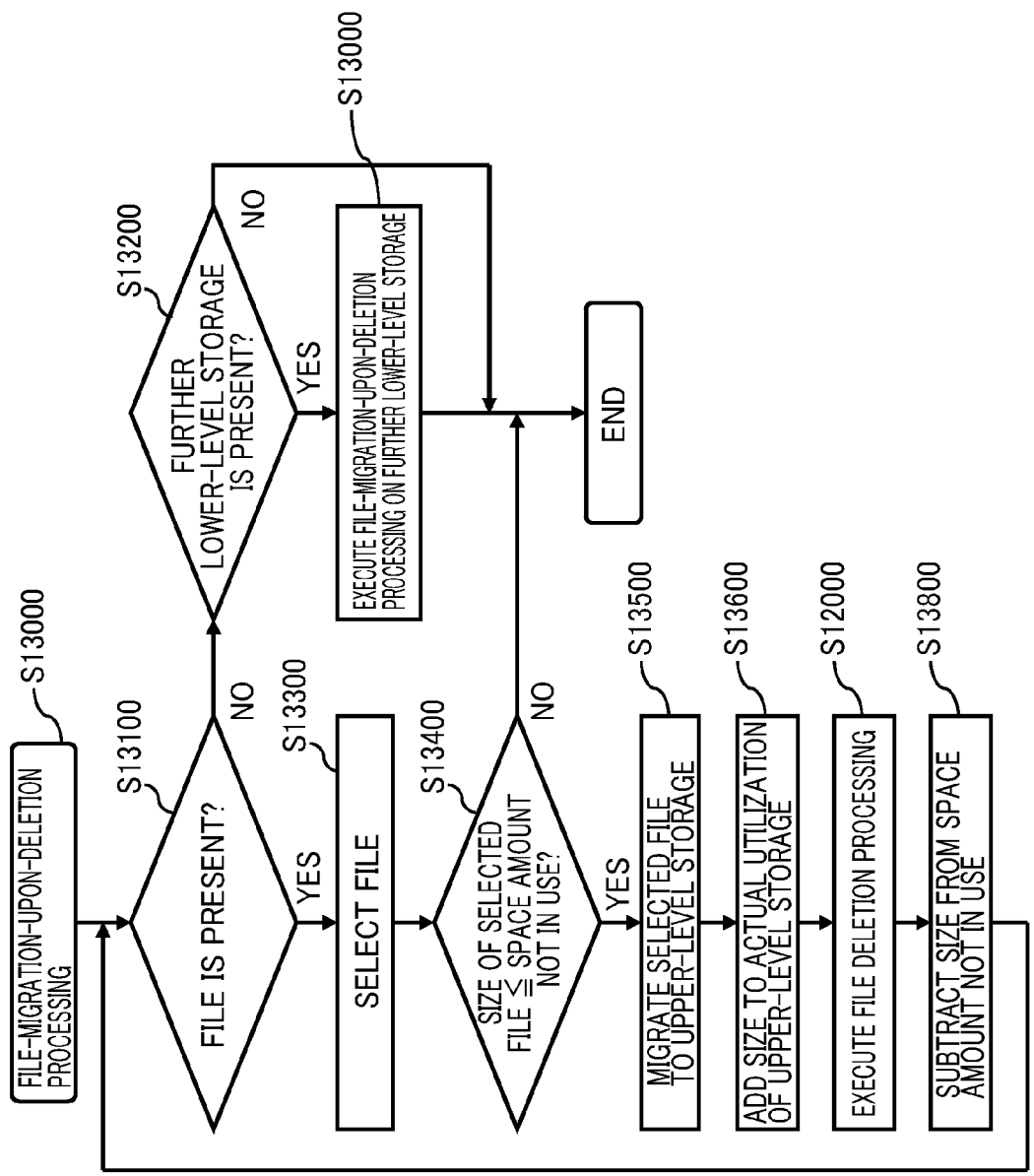
[FIG. 15]

FIG. 15 is a flowchart showing an example of a procedure of the file-migration-upon-deletion processing. The procedure is executed by the file-migration-upon-deletion processing part 2610 of the hierarchical storage controller 2600. In this procedure, the space amount not in use is received as an execution argument from the preceding procedure, i.e. the file deletion processing. In the file-migration-upon-deletion processing (S13000), first, a judgment is made as to whether there is a file in the target storage apparatus S1, S2, or S3 (S13100).

If there is no file in the target storage apparatus (No at S13100), a judgment is made as to whether there is any file in the storage apparatus at a still lower level (S13200). If there is no file in the storage apparatus at the still lower level (No at S13200), the processing ends. If there is any file in the storage apparatus at the still lower level (Yes at S13200), the file-migration-upon-deletion processing is executed on that storage apparatus at the still lower level (S13000).

If there is any file in the target storage apparatus S1, S2, or S3 (Yes at S13100), one file is selected as a migration target file (S13300). The file may be selected according to any criterion defined by the administrator or user; however, here, the most recently accessed and used file is selected, for example. Then, a judgment is made as to whether the size of the selected file is equal to or less than the space amount not in use (S13400). If the size of the selected file is larger than the space amount not in use (No at S13400), the processing ends. If the size of the selected file is equal to or less than the space amount not in use (Yes at S13400), the selected file is migrated to the storage apparatus at the immediate higher level (S13500). At this time, the free space amount 3101 of the storage apparatus at the immediate higher level stored in the storage free space amount table 3100 is reduced by the size of the migration target file (the free space amount of the target storage apparatus is increased in the later processing S12000).

Then, the size of the migration target file is added to the user's actual utilization 3601 of the storage apparatus at the immediate higher level stored in the user actual utilization table 3600 (S13600). Then, the file deletion processing is executed on the migration target file as a deletion target file (S12000). Finally, the size of the migration target file is subtracted from the space amount not in use (S13800), and the processing returns to the first judgment step (S13100).

By the above-mentioned file deletion processing, when the file stored in the storage apparatus at the higher level is deleted, the hierarchical storage controller 2000 can migrate the file stored in the storage apparatus at the lower level to the storage apparatus at the higher level, according to the space amount not in use generated by the file deletion.

Capacity Addition Processing

Figure 16:
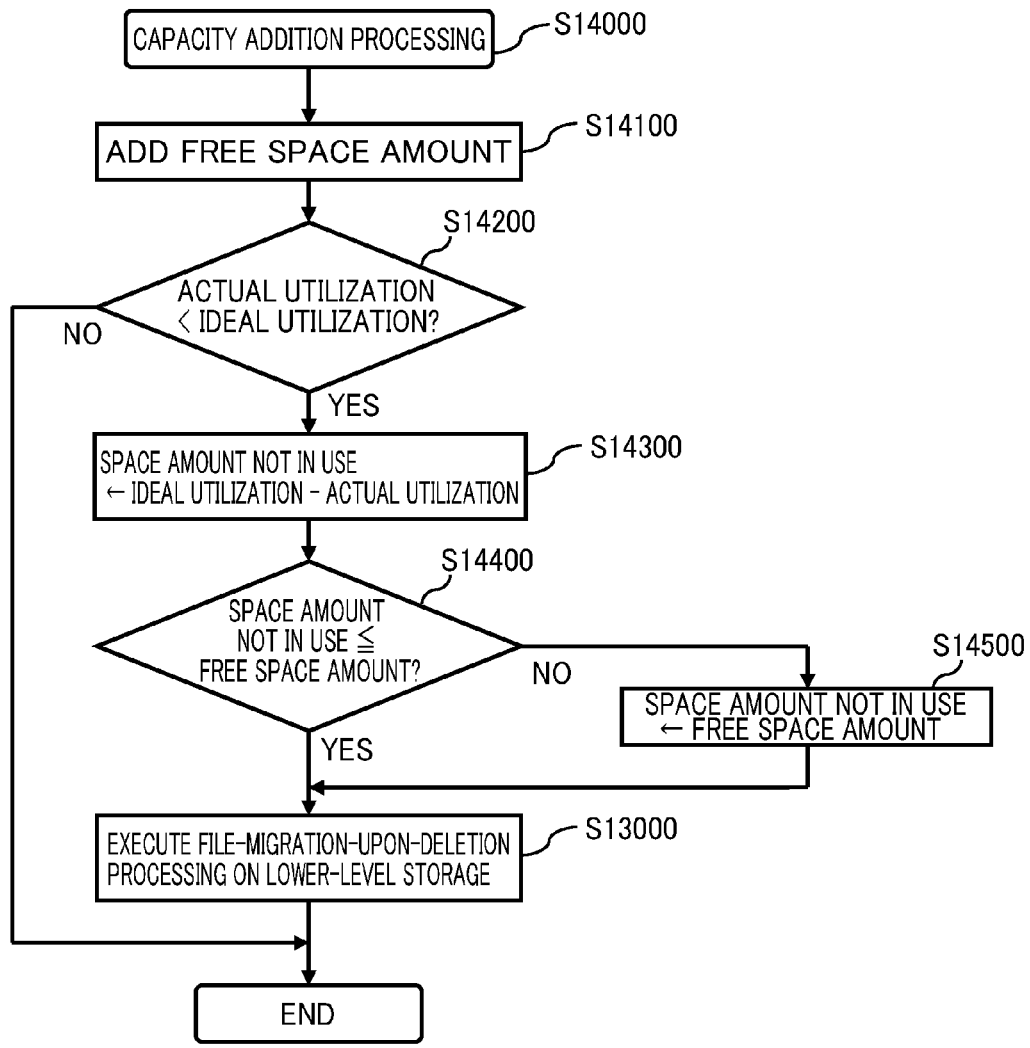
[FIG. 16]

FIG. 16 is a flowchart showing an example of a procedure of the capacity addition processing for the storage apparatus according to Example 1. The procedure is executed by the capacity addition processing part 2611 of the hierarchical storage controller 2600. In this procedure, a temporary variable called a space amount not in use is used, as in the case of the file-migration-upon-deletion processing. The initial value of the space amount not in use is zero. Note that it is assumed that the procedure for physically adding capacity to the storage apparatuses S1 to S3 and the procedure for managing the existing storage apparatuses, which have no direct relation to the present invention, are executed for example by the basic program 2500 of the hierarchical storage controller 2000, and description thereof will be omitted.

In addition, the following processing may be repeatedly performed for each of the users A to C who use the hierarchical storage system 1000. In order to avoid unevenly performing the processing on a particular one of the users A to C, the processing may be switched to the next one of the users A to C every time one file is migrated repeatedly until any migration target file or free space amount is no longer left. In the capacity addition processing (S14000), first, for each of the storage apparatuses S1 to S3 targeted for capacity increase, its capacity increase amount is added to the free space amount 3101 (S14100) stored in the storage free space amount table 3100.

Then, a judgment is made as to whether the user's actual utilization of the target storage apparatus stored in the user actual utilization table 3600 is less than the user's ideal utilization of the storage apparatus stored in the user ideal utilization table 3500 (S14200). If the actual utilization is equal to or more than the ideal utilization (No at S14200), the processing ends. If the actual utilization is less than the ideal utilization (Yes at S14200), the space amount not in use is set to a value obtained by subtracting the actual utilization from the ideal utilization (S14300).

Then, a judgment is made as to whether the space amount not in use is equal to or less than the free space amount 3101 of the target storage apparatus S1, S2, or S3 stored in the storage free space amount table 3100 (S14400). If the space amount not in use is more than the free space amount (No at S14400), the space amount not in use is set to a value corresponding to the free space amount 3101 (S14500), and the processing goes to the same processing as that executed when the space amount not in use is equal to or less than the free space amount. If the space amount not in use is equal to or less than the free space amount (Yes at S14400), the file-migration-upon-deletion processing is executed on the storage apparatus at the immediate lower level (S13000).

By the above-mentioned capacity addition processing, the hierarchical storage controller 2000 can migrate a file from the storage apparatus of a certain level to which the capacity is added, to the storage apparatus at a lower level. Moreover, when a new level is added to the hierarchical storage system 1000, the hierarchical storage controller 2000 can add an entry of the new storage hierarchical level to each of the user cost distribution table 3400, the user ideal utilization table 3500, and the user actual utilization table 3600, set their values to zero, and perform the above-mentioned capacity addition processing.

To summarize, in the hierarchical storage system 1000 according to Example 1, the hierarchical storage system 1000 uses the user ideal utilization table 3500 and the user actual utilization table 3600 to limit the utilization. The utilization can be effectively limited by using the storage cost coefficient table 3200 and the user cost allocation table 3300 set by the administrator.

Also, the user can set the user cost distribution table 3400 to flexibly set the limit of utilization of the storage apparatuses S1 to S3 within available costs allocated, according to the intended purpose.

Example 2

Figure 17:
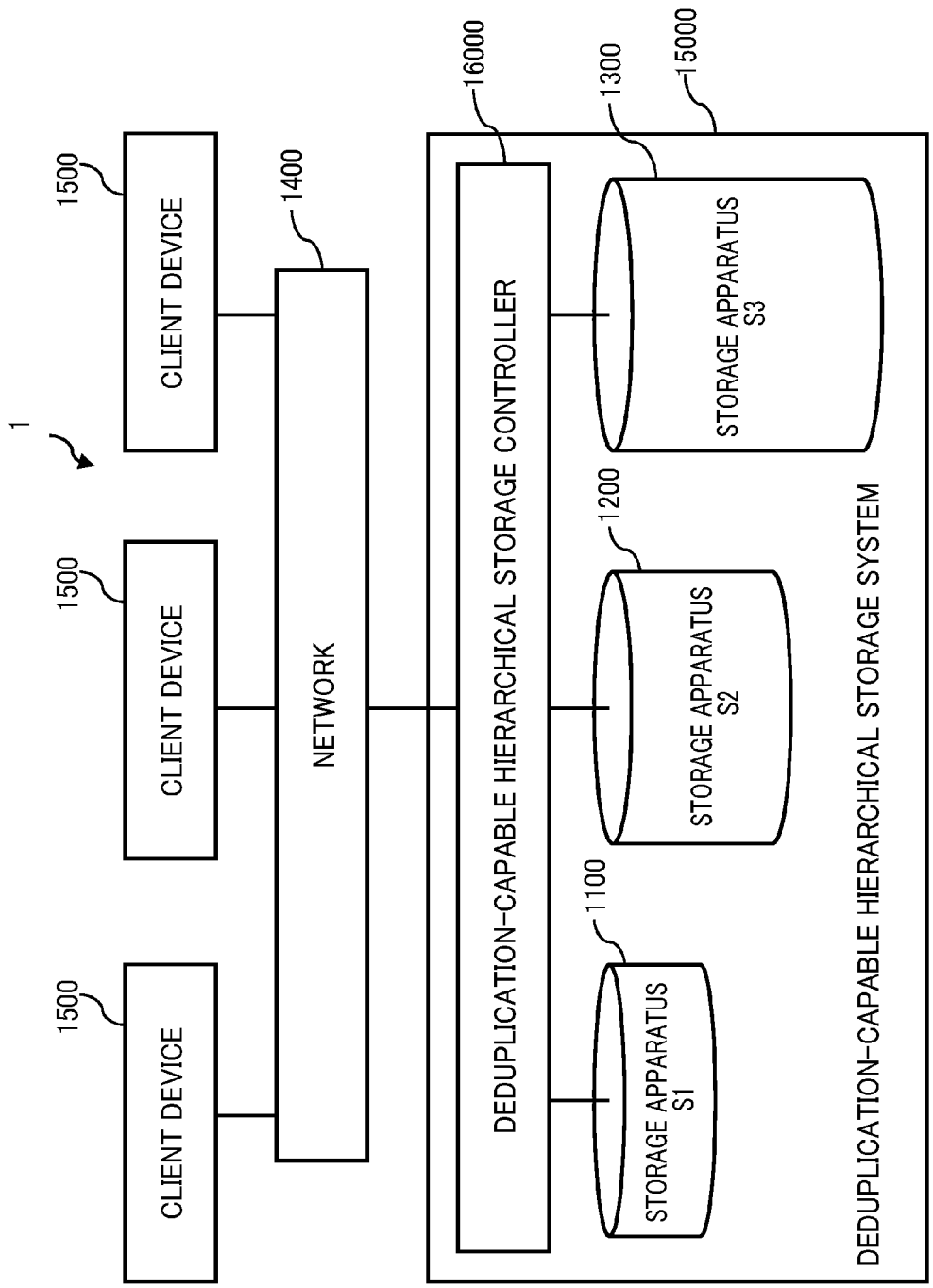
[FIG. 17]

Description will now be given with regard to the hierarchical storage system of the present invention based on another embodiment. FIG. 17 is a diagram showing a configuration example of the information processing system 1 including a de-duplication-capable hierarchical storage system 15000 according to Example 2 of the present invention. The de-duplication-capable hierarchical storage system 15000 includes a de-duplication-capable hierarchical storage controller 16000 instead of the hierarchical storage controller 2000 included in the hierarchical storage system 1000 of Example 1. As for the same structural components as those of Example 1, description will be omitted.

Figure 18:
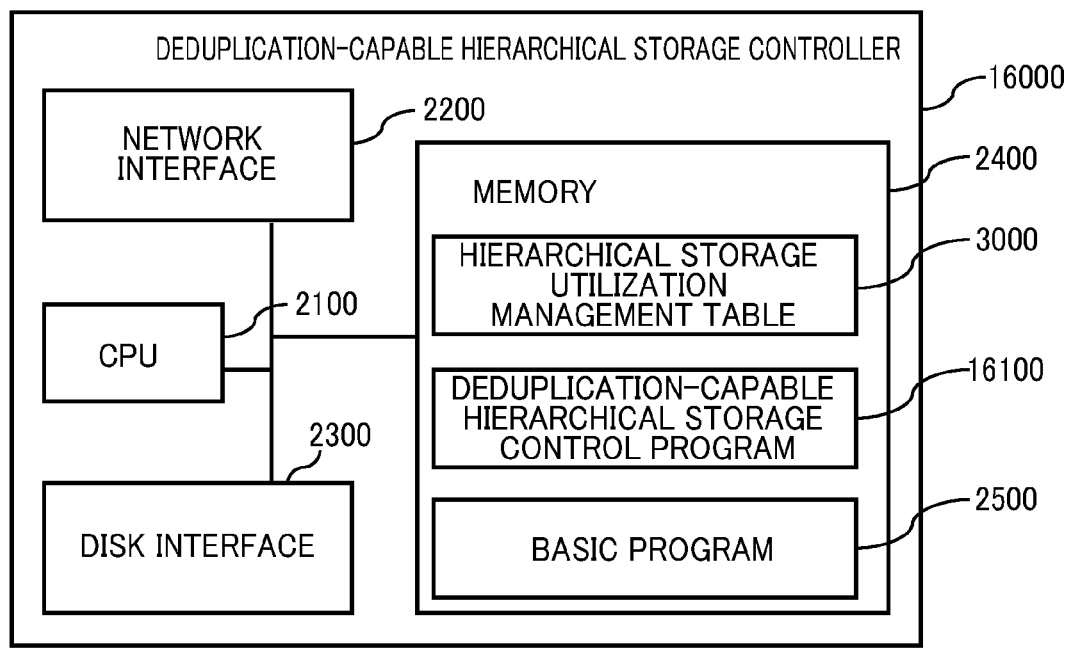
[FIG. 18]

FIG. 18 is a diagram showing a configuration example of the de-duplication-capable hierarchical storage controller 16000. The de-duplication-capable hierarchical storage controller 16000 includes a de-duplication-capable hierarchical storage control program 16100 in place of the hierarchical storage control program 2600 included in the hierarchical storage controller 2000 of Example 1. The de-duplication-capable hierarchical storage control program 16100 has the function of file de-duplication in the storage apparatus and across the storage apparatuses, in addition to the function of the hierarchical storage control program 2600 described in Example 1. The file de-duplication function described in the present example has the function of updating the hierarchical storage utilization management table 3000, in addition to the conventional de-duplication function. In the conventional de-duplication function, if files of the same contents are present in the plural storage apparatuses S1 to S3, duplicated file data are deleted, leaving file management information, such as GNS file paths or creation dates, of the files of the same contents, and only one piece of file data. Note that conventional de-duplication technologies include, for example, existing technology such as single instance storage (SIS) that involves detecting and deleting duplicated data on a file basis, and detailed description thereof is herein omitted.

Figure 19:
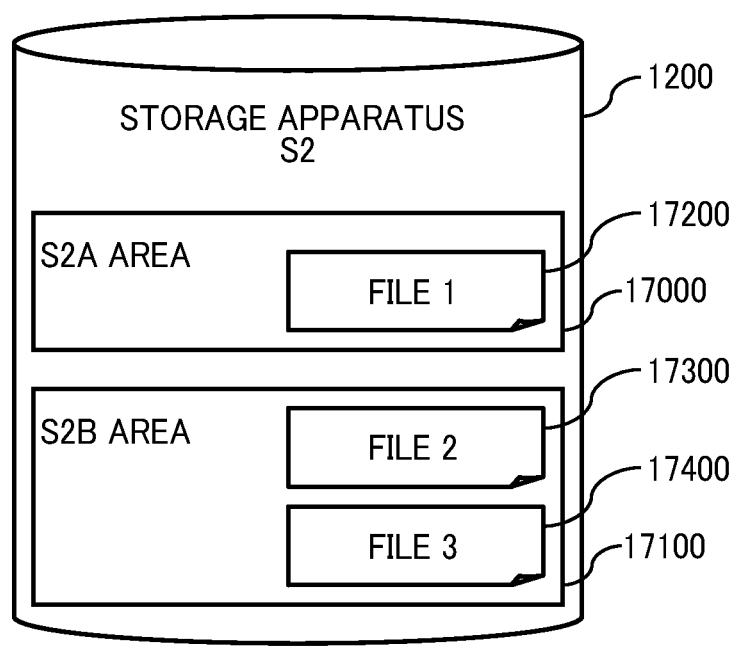
[FIG. 19]

FIG. 19 shows a file storage condition of the storage apparatus 1200 at the time of a de-duplication operation. The storage apparatus 1200 (S2) has an S2A area 17000 used by the user A, and an S2B area 17100 used by the user B. A file 1 (17200) is stored in the S2A area 17000, and a file 2 (17300) and a file 3 (17400) are stored in the S2B area 17100.

It is assumed that, by using the conventional de-duplication technology, the file 1 (17200), the file 2 (17300), and the file 3 (17400) are detected as having the same contents, and are thus targeted for de-duplication. When a duplicated file in an area used by the same user is deleted, the de-duplication-capable hierarchical storage controller 16000 according to Example 2 reduces the user's actual utilization 3602 of the storage apparatus in the user actual utilization table 3600, by the size of the deleted file. However, when a duplicated file in an area used by a different user is deleted, the de-duplication-capable hierarchical storage controller 16000 does not reduce the actual utilization 3602 recorded for the user in the user actual utilization table 3600. Specifically, assume that the de-duplication operation is performed to leave the file 1 (17200) and delete the file 2 (17300) and the file 3 (17400). In this instance, the actual utilization 3602 of the storage apparatus S2 of the user A stored in the user actual utilization table 3600 does not change, whereas the actual utilization 3602 of the storage apparatus S2 of the user B is reduced by the size of the deleted file by the de-duplication-capable hierarchical storage controller 16000. Also, the de-duplication-capable hierarchical storage controller 16000 increases the free space amount 3101 of the storage apparatus S2 stored in the storage free space amount table 3100, by the size of the deleted file.

After the de-duplication operation, setting is done so that read access from the client device 1500 to the file 2 (17300) or the file 3 (17400) is performed on the file 1 (17200). Also, setting is done so that write access from the client device 1500 to the file 2 (17300) or the file 3 (17400) is performed after data of the file 1 (17200) is duplicated as the file 2 (17300) or the file 3 (17400). In this case, the user actual utilization table 3600 does not change, and file storage beyond the limit of the user ideal utilization table 3500 does not take place.

Figure 20:
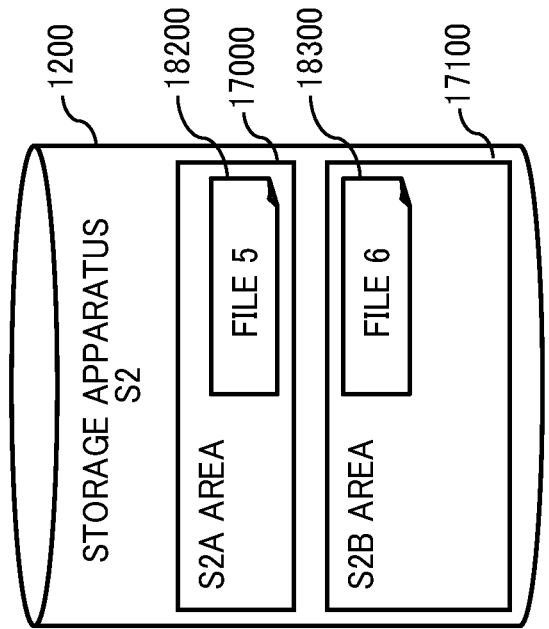
[FIG. 20]
Figure 20:
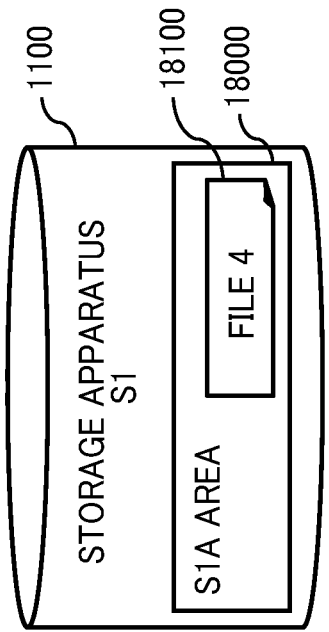

FIG. 20 shows a file storage condition of the storage apparatus 1100 (S1) and the storage apparatus 1200 (S2) at the time of a de-duplication operation. The storage apparatus S1 has an S1A area 18000 used by the user A, in which a file 4 (18100) is stored. Also, in the storage apparatus S2 which is the immediate lower level of the storage apparatus S1, a file 5 (18200) is stored in the S2A area 17000 used by the user A, and a file 6 (18300) is stored in the S2B area 17100 used by the user B.

It is assumed that, by using the conventional de-duplication technology, the file 4 (18100), the file 5 (18200) and the file 6 (18300) are detected as having the same contents, and thus are targeted for de-duplication. When performing de-duplication for the storage apparatuses S1 and S2 at different hierarchical levels, the de-duplication-capable hierarchical storage controller 16000 according to Example 2 leaves the file stored in the storage apparatus S1 of the higher hierarchical level and deletes the duplicated file stored in the storage apparatus S2 at the lower hierarchical level. Here, the actual utilization 3602 recorded in the user actual utilization table 3600 of the storage apparatus S2 at the lower hierarchical level is not reduced. Thus, in this instance, the de-duplication operation does not change the user actual utilization table 3600, and increases the free space amount 3101 of the storage apparatus S2 stored in the storage free space amount table 3100 by the size of the two deleted files.

After the de-duplication operation, setting is done so that read access from the client device 1500 to the file 5 (18200) or the file 6 (18300) is performed on the file 4 (18100). Also, setting is done so that write access from the client device 1500 to the file 5 (18200) or the file 6 (18300) is performed after data of the file 4 (18100) is duplicated as the file 5 (18200) or the file 6 (18300). Also in this case, the user actual utilization table 3600 does not change, and file storage beyond the limit of the user ideal utilization table 3500 does not take place. Further, to delete the file 4 (18100) from the S1A area (18000), the de-duplication-capable hierarchical storage controller 16000 can duplicate the contents of the file 4 (18100) as the contents of the file 5 (18200) or the file 6 (18300) and then perform the file deletion processing described in Example 1.

To summarize, in the de-duplication-capable hierarchical storage system 15000 according to Example 2, the de-duplication operation executed by the de-duplication-capable hierarchical storage controller 16000 can delete data of a duplicated file, thus increase the free space amount of the storage apparatus and thereby achieve efficient use of the area of the storage apparatus, while implementing the limit of utilization by using the user ideal utilization table 3500 in Example 1.

In short, according to the embodiments of the present invention, in the hierarchical storage system, the administrator can define the cost coefficient for each storage apparatus and allocate available costs for each user. Accordingly, the limit of utilization can be effectively set. Also, the user can set the user cost distribution table 3400 to flexibly set the limit of utilization of the storage apparatus within the available costs allocated, according to the intended purpose.

While the invention of the present application has been described with reference to the accompanying drawings based on the examples, it is to be understood that the invention is not limited to these examples, and includes any modification or equivalent thereof without departing from the basic concept and scope of the invention.

The invention claimed is:

1. A storage system being coupled communicatively to an external device and providing a storage area to be used by the external device, comprising:
   a plurality of storage apparatuses of different performance capabilities, each having a storage medium that provides the storage area; and
   a storage controller configured to control a use capacity of each of the storage apparatuses for each user using the storage system, the storage controller including:
   a storage part;
   a de-duplication part; and
   a use capacity checking part,
   wherein the storage part stores
   available space amount information indicating an available space amount of the storage area of each of the storage apparatuses,
   ideal utilization information indicating ideal utilization of the storage area of each of the storage apparatuses by each user, the ideal utilization information being used for limiting utilization of the storage area of each of the storage apparatuses by each user, and
   actual utilization information indicating actual utilization of the storage areas of each of the storage apparatuses by each user,
   wherein the de-duplication part is configured to determine whether or not a plurality of pieces of identical data are stored in the respective storage apparatuses, when it is determined that a plurality of pieces of identical data are stored in one or more of the storage apparatuses, deletes the pieces of identical data except meta data of the identical data and any one of the pieces of the identical data, and changes the available space amount information of the storage apparatus that has stored the pieces of identical data as deleted,
   wherein the use capacity checking part is configured to determine whether or not the actual utilization exceeds the available space amount or the ideal utilization for each of the storage apparatuses based on the available space amount information, the ideal utilization information and the actual utilization information, when the actual utilization in any of the storage apparatus exceeds the available space amount or the ideal utilization, migrates at least a part of the data stored in the storage apparatus as determined to another storage apparatus, and changes the available space amount information and the actual utilization information of the storage apparatus from which the data are migrated and the storage apparatus to which the data are migrated.

2. The storage system according to claim 1,
   wherein a user storage area for a user is set in each of the storage apparatuses,
   wherein the de-duplication part is configured to determine whether or not any of the user storage areas in any of the storage apparatuses stores a plurality of pieces of identical data, when it is determined that any of the user storage areas stores a plurality of pieces of identical data, deletes the pieces of identical data except meta data of the identical data and any of the pieces of the identical data, and changes the actual utilization information of the user storage area that has stored the pieces of identical data as deleted.

3. The storage system according to claim 1,
   wherein a user storage area for a user is set in each of the storage apparatuses,
   wherein the de-duplication part is configured to determine whether or not any of the user storage areas in any of the storage apparatuses stores a plurality of pieces of identical data, when it is determined any of the user storage areas stores a plurality of pieces of identical data, deletes the pieces of identical data except meta data of the identical data and one of the pieces of the identical data, and changes the available space amount information of the storage apparatuses that have stored the other pieces of the identical data as deleted while the actual utilization information of the storage apparatuses that have stored the other pieces of identical data as deleted is not changed.

4. The storage system according to claim 1,
   wherein the use capacity checking part is configured to determine whether or not the actual utilization exceeds the available space amount or the ideal utilization in each of the storage apparatuses in an order of performance capabilities of the storage apparatus from highest to lowest, when it is determined that the actual utilization exceeds the available space amount or the ideal utilization in any of the storage apparatuses, migrates at least a part of the data in the storage apparatus thus determined to any of the storage apparatuses with lower performance capability.

5. The storage system according to claim 1, wherein
   when the actual utilization exceeds the available space amount or the ideal utilization in any of the storage apparatuses, the use capacity checking part is configured to determine whether or not any of the storage apparatus to which at least a part of the data stored in the storage apparatus as thus determined can be migrated is present, and, when it is determined the storage apparatus to which the data to be migrated is not present, transmits capacity shortage error information indicating capacity shortage of the storage system to the external device.

6. The storage system according to claim 1, wherein
   the storage part further stores
   user cost allocation information indicating a cost to be allocated to and available to each user,
   a storage cost coefficient set according to performance of each of the storage apparatuses, indicating available capacity in each of the storage apparatuses for a unit cost,
   user cost distribution information indicating a value as the cost as distributed to each of the storage apparatuses for each user, the storage controller further including:
an ideal utilization calculation part that calculates the ideal utilization capacity for each user with the storage cost coefficients and the user cost distribution information and stores the ideal utilization capacity as calculated in the storage part.

7. The storage system according to claim 6, wherein, when the ideal utilization is calculated with the ideal utilization calculation part, the use capacity checking part is configured to determine whether or not data corresponding to a total amount of the ideal utilization of the respective users can be stored in an available space of the respective storage apparatuses.

8. The storage system according to claim 7, wherein, when the use capacity checking part determines that the data corresponding to a total amount of the ideal utilization of the respective users cannot be stored in the available space of the respective storage apparatuses, the use capacity checking part is configured to transmit capacity shortage error information indicating capacity shortage in the storage system to the external device.

9. The storage system according to claim 6, wherein the storage cost coefficients are set based on a proportion of a performance measurement value of each of the storage apparatuses, the performance measurement value including a value of data I/O performance of each of the storage apparatuses.

10. A management method of utilization in a storage system, the storage system being coupled communicatively to an external device and providing a storage area to be used by the external device, including:
a plurality of storage apparatuses of different performance capabilities, each having a storage medium that provides the storage area; and
a storage controller configured to control a use capacity of each of the storage apparatuses for each user using the storage system, the management method of utilization comprising:
creating and storing available space amount information indicating an available space amount of the storage area of each of the storage apparatuses;
creating and storing ideal utilization information indicating ideal utilization of the storage area of each of the storage apparatuses by each user, the ideal utilization information being used for limiting utilization of the storage area of each of the storage apparatuses by each user;
creating and storing actual utilization information indicating actual utilization of the storage areas of each of the storage apparatuses by each user;
determining whether or not a plurality of pieces of identical data are stored in the respective storage apparatuses;
when it is determined that a plurality of pieces of identical data are stored in one or more of the storage apparatuses, deleting the pieces of identical data except meta data of the identical data and any one of the pieces of the identical data, and changing the available space amount information of the storage apparatus that has stored the pieces of identical data as deleted;
determining whether or not the actual utilization exceeds the available space amount or the ideal utilization for each of the storage apparatuses based on the available space amount information, the ideal utilization information and the actual utilization information;
when the actual utilization in any of the storage apparatus exceeds the available space amount or the ideal utilization, migrating at least a part of the data stored in the storage apparatus as determined to another storage apparatus, and changing the available space amount information and the actual utilization information of the storage apparatus from which the data are migrated and the storage apparatus to which the data are migrated.

11. The management method of utilization in a storage system according to claim 10,
wherein a user storage area for a user is set in each of the storage apparatuses,
wherein the de-duplication part determines whether or not any of the user storage areas in any of the storage apparatuses stores a plurality of pieces of identical data, when it is determined that any of the user storage areas stores a plurality of pieces of identical data, deletes the pieces of identical data except meta data of the identical data and any of the pieces of the identical data, and changes the actual utilization information of the user storage area that has stored the pieces of identical data as deleted.

12. The management method of utilization in a storage system according to claim 10,
wherein a user storage area for a user is set in each of the storage apparatuses,
wherein the de-duplication part determines whether or not any of the user storage areas in any of the storage apparatuses stores a plurality of pieces of identical data, when it is determined any of the user storage areas stores a plurality of pieces of identical data, deletes the pieces of identical data except meta data of the identical data and one of the pieces of the identical data, and changes the available space amount information of the storage apparatuses that have stored the other pieces of the identical data as deleted while the actual utilization information of the storage apparatuses that have stored the other pieces of identical data as deleted is not changed.

13. The management method of utilization in a storage system according to claim 10,
wherein the use capacity checking part determines whether or not the actual utilization exceeds the available space amount or the ideal utilization in each of the storage apparatuses in an order of performance capabilities of the storage apparatus from highest to lowest, when it is determined that the actual utilization exceeds the available space amount or the ideal utilization in any of the storage apparatuses, migrates at least a part of the data in the storage apparatus thus determined to any of the storage apparatuses with lower performance capability.

14. The management method of utilization in a storage system according to claim 10, wherein
when the actual utilization exceeds the available space amount or the ideal utilization in any of the storage apparatuses, the use capacity checking part determines whether or not any of the storage apparatus to which at least a part of the data stored in the storage apparatus as thus determined can be migrated is present, and, when it is determined the storage apparatus to which the data to be migrated is not present, transmits capacity shortage error information indicating capacity shortage of the storage system to the external device.

15. The management method of utilization in a storage system according to claim 10, wherein
the storage part further stores
user cost allocation information indicating a cost to be allocated to and available to each user,
a storage cost coefficient set according to performance of each of the storage apparatuses, indicating available capacity in each of the storage apparatuses for a unit cost, user cost distribution information indicating a value as the cost as distributed to each of the storage apparatuses for each user, the storage controller further including:

an ideal utilization calculation part that calculates the ideal utilization capacity for each user with the storage cost coefficients and the user cost distribution information and stores the ideal utilization capacity as calculated in the storage part.

16. The management method of utilization in a storage system according to claim 15, wherein, when the ideal utilization is calculated with the ideal utilization calculation part, the use capacity checking part determines whether or not data corresponding to a total amount of the ideal utilization of the respective users can be stored in an available space of the respective storage apparatuses.

17. The management method of utilization in a storage system according to claim 16, wherein, when the use capacity checking part determines that the data corresponding to a total amount of the ideal utilization of the respective users cannot be stored in the available space of the respective storage apparatuses, the use capacity checking part transmits capacity shortage error information indicating capacity shortage in the storage system to the external device.

18. The management method of utilization in a storage system according to claim 15, wherein the storage cost coefficients are set based on a proportion of a performance measurement value of each of the storage apparatuses, the performance measurement value including a value of data I/O performance of each of the storage apparatuses.

* * * * *